US012757247B2

(12) United States Patent
Guo et al.

(10) Patent No.: US 12,757,247 B2
(45) Date of Patent: Oct. 6, 2026

(54) CROSS-FIXED FRAME PERIOD (FFP) SCHEDULING OF HYBRID AUTOMATIC REPEAT REQUEST (HARQ)

(71) Applicant: QUALCOMM Incorporated, San Diego, CA (US)

(72) Inventors: Shaozhen Guo, Beijing (CN); Jing Sun, San Diego, CA (US); Changlong Xu, Beijing (CN); Xiaoxia Zhang, San Diego, CA (US); Hao Xu, Beijing (CN); Luanxia Yang, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/557,622

(22) PCT Filed: Jul. 1, 2021

(86) PCT No.: PCT/CN2021/103997
§ 371 (c)(1),
(2) Date: Oct. 27, 2023

(87) PCT Pub. No.: WO2023/272680
PCT Pub. Date: Jan. 5, 2023

(65) Prior Publication Data

US 2024/0244658 A1 Jul. 18, 2024

(51) Int. Cl.
*H04W 74/0808* (2024.01)
*H04L 1/1829* (2023.01)

(52) U.S. Cl.
CPC ....... *H04W 74/0808* (2013.01); *H04L 1/1864* (2013.01)

(58) Field of Classification Search
None
See application file for complete search history.

(56) References Cited

U.S. PATENT DOCUMENTS

2019/0045533 A1 2/2019 Chatterjee et al.
2020/0084759 A1* 3/2020 Liu ...................... H04L 1/1671
(Continued)

FOREIGN PATENT DOCUMENTS

EP 3817494 A1 5/2021
WO 2020254274 A1 12/2020

OTHER PUBLICATIONS

Huawei, HiSilicon, Coexistence and Channel Access for NR Unlicensed Band Operations, Oct. 2019, 3GPP TSG RAN WG1 Meeting #98bis, R1-1910045, pp. 1-18. (Year: 2019).*
(Continued)

*Primary Examiner* — Nicholas Sloms
(74) *Attorney, Agent, or Firm* — Harrity & Harrity, LLP

(57) ABSTRACT

A method of wireless communication performed by a user equipment (UE) includes receiving, from a base station (BS) in a first fixed frame period (FFP), downlink communication information (DCI), where the DCI indicates a scheduled DL communication in a second FFP subsequent to the first FFP. The method also includes monitoring for a downlink (DL) signal in the second FFP. The method also includes transmitting, based on the monitoring for the DL signal, an acknowledgement/non-acknowledgement (ACK/NACK) indicating whether the scheduled DL communication was detected.

30 Claims, 13 Drawing Sheets

(56) References Cited

U.S. PATENT DOCUMENTS

| | | | | |
|---|---|---|---|---|
| 2020/0229239 | A1* | 7/2020 | Fan | H04W 72/566 |
| 2020/0374933 | A1* | 11/2020 | Lou | H04W 74/006 |
| 2021/0084683 | A1* | 3/2021 | Li | H04W 74/0808 |
| 2021/0392684 | A1* | 12/2021 | Tiirola | H04W 74/0808 |
| 2022/0007399 | A1* | 1/2022 | Rastegardoost | H04L 1/1861 |
| 2022/0070922 | A1* | 3/2022 | Talarico | H04W 72/1268 |
| 2022/0167407 | A1* | 5/2022 | Oviedo | H04W 72/0446 |
| 2022/0225386 | A1* | 7/2022 | Salah | H04W 72/23 |
| 2022/0287035 | A1* | 9/2022 | Yang | H04L 5/001 |
| 2022/0377790 | A1* | 11/2022 | Awadin | H04W 74/08 |
| 2023/0064829 | A1* | 3/2023 | Yang | H04W 72/23 |
| 2023/0209598 | A1* | 6/2023 | Wu | H04W 16/14<br>370/329 |
| 2024/0098781 | A1* | 3/2024 | Tsai | H04W 74/0808 |
| 2025/0176024 | A1* | 5/2025 | Jiang | H04W 74/006 |
| 2025/0226926 | A1* | 7/2025 | Hedayat | H04W 74/002 |

OTHER PUBLICATIONS

ETRI, Enhancements for Unlicensed Band URLLC/IIoT, Apr. 2021, 3GPP TSG RAN WG1 #104b-e, R1-2103326, pp. 1-9. (Year: 2021).*

Lenovo, Enhancements for Unlicensed Band URLLC/IIoT, May 2021, 3GPP TSG RAN WG1 #105-e, R1-2105768, pp. 1-4. (Year: 2021).*

Qualcomm, Uplink Enhancements for URLLC in Unlicensed Controlled Environments, Aug. 2020, 3GPP TSG RAN WG1 Meeting #102-e, R1-2006801, pp. 1-7. (Year: 2020).*

International Search Report and Written Opinion—PCT/CN2021/103997—ISA/EPO—Apr. 3, 2022.

Lenovo., et al., "HARQ-ACK Enhancement for NR-U", 3GPP TSG RAN WG1 Ad-Hoc Meeting 1901, 3GPP Draft, R1-1900396, 3rd Generation Partnership Project (3GPP), Mobile Competence Centre, 650, Route Des Lucioles, F-06921 Sophia-Antipolis Cedex, France, vol. RAN WG1, No., Taipel, Jan. 21, 2019-Jan. 21, 2019, Jan. 20, 2019 (Jan. 20, 2019), 4 Pages, XP051593310, Figures 1, 2, Section 2.1.

Mediatek Inc: "Enhancements on HARQ for NR-U Operation", 3GPP Draft, 3GPP TSG RAN WG1 Meeting #95, R1-1812358_Enhancements on HARQ for NR-U Operation_Final, 3rd Generation Partnership Project (3GPP), Mobile Competence Centre, 650, Route Des Lucioles, F-06921 Sophia-Antipolis Cedex, F, vol. RAN WG1 , No. Spokane, USA, Nov. 12, 2018-Nov. 16, 2018, Nov. 11, 2018 (Nov. 11, 2018), XP051554267, 7 Pages, p. 3, paragraph 2.2 figures 2 (c), 2(d), Section 2.1.

Partial International Search Report—PCT/CN2021/103997—ISA/EPO—Dec. 21, 2021.

Spreadtrum Communications: "Discussion on HARQ Enhancements in NR-U", 3GPP Draft, 3GPP TSG RAN WG1 Ad-Hoc Meeting 1901, R1-1900706, Discussion on HARQ Enhancements in NR-U, 3rd Generation Partnership Project (3GPP), Mobile Competence Centre, 650, Route Des Lucioles, F-06921 Sophia-Antipolis Cedex, France, vol. RAN WG1, No., Taipei, Jan. 21, 2019-Jan. 25, 2019, Jan. 20, 2019 (Jan. 20, 2019), pp. 1-5, XP051593553, Figures 1, Section 2.1.

* cited by examiner

CROSS-FIXED FRAME PERIOD (FFP) SCHEDULING OF HYBRID AUTOMATIC REPEAT REQUEST (HARQ)

CROSS-REFERENCE TO RELATED APPLICATIONS

The present application is a 35 U.S.C. 371 National Phase entry of Patent Cooperation Treaty (PCT) Application No. PCT/CN2021/103997, filed Jul. 1, 2021, which is hereby expressly incorporated herein by reference in its entirety.

TECHNICAL FIELD

This application relates to wireless communication systems, and more particularly to frame based equipment (FBE) communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHZ, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. There are two types of LBT procedures, a load based equipment (LBE)-based LBT and a frame based equipment (FBE)-based LBT. In LBE-based LBT, channel sensing is performed at any time instant and random back-off is used if the channel is found busy. In FBE-based LBT, channel sensing is performed at predetermined time instants (e.g., associated with fixed frame periods (FFPs)). For instance, if the channel is busy, a transmitting node may back off for a predetermined time period and sense the channel again after this period.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a user equipment (UE). The method includes receiving, from a base station (BS) in a first fixed frame period (FFP), downlink communication information (DCI), where the DCI indicates a scheduled DL communication in a second FFP subsequent to the first FFP. The method also includes monitoring for a DL signal in the second FFP. The method also includes transmitting, based on the monitoring for the DL signal, an acknowledgement/non-acknowledgement (ACK/NACK) indicating whether the scheduled DL communication was detected.

One aspect of the present disclosure includes a method of wireless communication performed by a base station (BS). The method includes transmitting, to a user equipment (UE) in a first fixed frame period (FFP), downlink communication information (DCI), where the DCI indicates a scheduled DL communication in a second FFP subsequent to the first FFP. The method also includes performing a channel assessment for a BS channel occupancy time (COT) in the second FFP. The method also includes determining, based on the channel assessment, not to initiate the BS COT. The method also includes receiving, in a UE COT, a non-acknowledgement (NACK) signal.

One aspect of the present disclosure includes a user equipment (UE). The UE includes a transceiver and a processor in communication with the transceiver. The processor is configured to: cause the transceiver to receive, from a base station (BS) in a first fixed frame period (FFP), downlink communication information (DCI), where the DCI indicates a scheduled DL communication in a second FFP subsequent to the first FFP; monitor for a DL signal in the second FFP; and cause the transceiver to transmit, based on the monitoring for the DL signal, an acknowledgement/non-acknowledgement (ACK/NACK) indicating whether the scheduled DL communication was detected One aspect of the present disclosure includes a base station (BS). The BS includes a transceiver and a processor in communication with the transceiver. The processor is configured to: cause the transceiver to transmit, to a user equipment (UE) in a first fixed frame period (FFP), downlink communication information (DCI), where the DCI indicates a scheduled DL communication in a second FFP subsequent to the first FFP; perform a channel assessment for a BS channel occupancy time (COT) in the second FFP; determine, based on the channel assessment, not to initiate the BS COT; and cause the transceiver to receive, in a UE COT, a non-acknowledgement (NACK) signal.

One aspect of the present disclosure includes a non-transitory computer-readable medium having program code recorded thereon. The program code includes code for causing a user equipment (UE) to receive, from a base station (BS) in a first fixed frame period (FFP), downlink communication information (DCI), where the DCI indicates a scheduled DL communication in a second FFP subsequent to the first FFP. The program code also includes code for causing the UE to monitor for a DL signal in the second FFP. The program code also includes code for causing the UE to transmit, based on the monitoring for the DL signal, an acknowledgement/non-acknowledgement (ACK/NACK) indicating whether the scheduled DL communication was detected.

One aspect of the present disclosure includes a non-transitory computer-readable medium having program code recorded thereon. The program code includes code for causing a base station (BS) to transmit, to a user equipment (UE) in a first fixed frame period (FFP), downlink communication information (DCI), where the DCI indicates a scheduled DL communication in a second FFP subsequent to the first FFP. The program code also includes code for causing the BS to perform a channel assessment for a BS channel occupancy time (COT) in the second FFP. The program code also includes code for causing the BS to determine, based on the channel assessment, not to initiate the BS COT. The program code also includes code for causing the BS to receive, in a UE COT, a non-acknowledgement (NACK) signal.

One aspect of the present disclosure includes a user equipment (UE). The UE includes means for receiving, from a base station (BS) in a first fixed frame period (FFP), downlink communication information (DCI), where the DCI indicates a scheduled DL communication in a second FFP subsequent to the first FFP. The UE also includes means for monitoring for a DL signal in the second FFP. The UE also includes means for transmitting, based on the monitoring for the DL signal, an acknowledgement/non-acknowledgement (ACK/NACK) indicating whether the scheduled DL communication was detected.

One aspect of the present disclosure includes a base station (BS). The BS includes means for transmitting, to a user equipment (UE) in a first fixed frame period (FFP), downlink communication information (DCI), where the DCI indicates a scheduled DL communication in a second FFP subsequent to the first FFP. The BS also includes means for performing a channel assessment for a BS channel occupancy time (COT) in the second FFP. The BS also includes means for determining, based on the channel assessment, not to initiate the BS COT. The BS also includes means for receiving, in a UE COT, a non-acknowledgement (NACK) signal.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
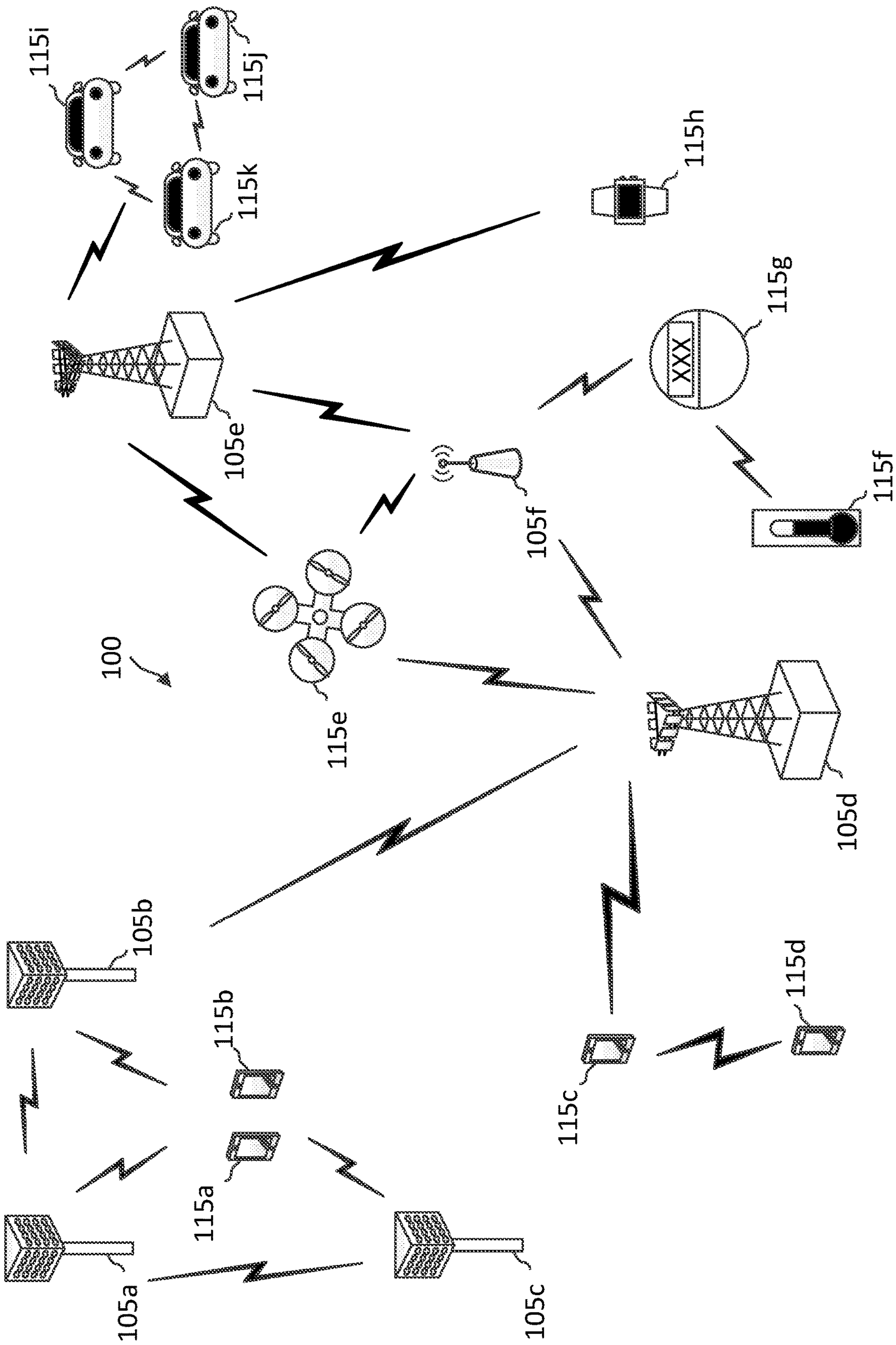
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms “networks” and “systems” may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~IM nodes/km$^2$), ultra-low complexity (e.g., ~10 s of bits/sec), ultra-low energy (e.g., ~10+ years of battery life), and deep coverage with the capability to reach challenging locations; (2) including time-stringent control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for facilitating efficient hybrid automatic repeat request (HARQ) communication scheduling in a frame based equipment (FBE) mode over a shared radio frequency band, including new radio-unlicensed (NR-U). When operating in a FBE mode, a base station (BS) may transmit control information (e.g., downlink control information (DCI)) in a first fixed frame period (FFP), where the DCI schedules a downlink (DL) communication in a subsequent second FFP. However, because the BS has not yet acquired a channel occupancy time (COT) in the second FFP, it is possible that the BS does not acquire the COT in the second FFP. Thus, the BS may not transmit the DL communication in the second FFP. From the UE perspective, if the UE does not detect the scheduled DL communication in the second FFP, it may not be known if the detection failure is a result of a failure to decode the DL communication, or if the BS did not transmit the DL communication. Accordingly, whether the UE should transmit HARQ feedback (e.g., a non-acknowledgement (NACK)) indicating the failure to detect/decode may be unknown. Further, whether the UE should transmit an acknowledgement (ACK) or a NACK based on a BS-initiated COT or a UE-initiated COT may also be unknown. This uncertainty may result in reduced efficiency, lower network performance, and/or user dissatisfaction. For example, if the UE transmits the ACK/NACK based on a BS-initiated COT timeline and the BS does not initiate the COT, an ACK/NACK transmitted by the UE in a shared BS COT may not be received by the BS. Further, the UE may forgo an opportunity to initiate a COT to facilitate the transmission of uplink data in order to transmit the ACK/NACK based on a BS COT.

As described further below, the present disclosure provides solutions to these issues. In this regard, the present disclosure describes mechanisms whereby the UE can determine to transmit an ACK/NACK in a UE-initiated COT or a BS-initiated COT based on at least one of a DL signal detection or a content of the scheduling DCI. For example, in some aspects, a BS may transmit a DCI in a first FFP, where the DCI schedules a DL communication in a subsequent second FFP. In response to successfully acquiring the COT in the second FFP, the BS may transmit a DL signal in the acquired BS COT indicating that the BS has acquired the COT, as well as the scheduled DL communication (e.g., PDSCH). If the BS does not acquire the COT in the second FFP, the BS does not transmit the DL signal or the scheduled DL communication in the second FFP. In one aspect, if the UE fails to detect or decode the scheduled DL communication, then the UE may determine to transmit a NACK in either a BS COT or a UE COT based on the DL signal. For example, if the UE detects the DL signal indicating that the BS acquired or won the COT in the second FFP, then the UE may transmit the NACK in the BS COT. Accordingly, the UE may refrain from acquiring or attempting to acquire a COT in the second FFP. In another example, if the UE fails to detect the DL signal, then the UE may initiate a UE COT at least partially overlapping with the second FFP, and transmit the NACK in the UE COT.

In a further aspect of the present disclosure, the UE may be configured to transmit an ACK/NACK based on a content in the scheduling DCI transmitted in the first FFP. For example, the DCI may indicate the UE to either initiate a UE COT or to share a BS COT. The UE may be configured to transmit the ACK/NACK based on this indication. Additionally, the UE may be configured to transmit the ACK/NACK based on the indication in the DCI and the detection of the DL signal in the second FFP. For example, if the DCI indicates the UE to share a BS COT in the second FFP, the UE may be configured to either (1) transmit the ACK/NACK in the BS COT if the UE detects the DL signal in the second FFP, or (2) refrain from transmitting the ACK/NACK if the UE fails to detect the DL signal in the second FFP. In another aspect, if the DCI indicates the UE to initiate a UE COT, the UE may be configured to either (1) transmit the ACK/NACK in a shared portion of the BS COT if the UE detects the DL signal in the second FFP, or (2) transmit the ACK/NACK in a UE COT if the UE does not detect the DL signal in the second FFP. These rules and/or parameters may be provided in a cross-FFP scheduling configuration, and/or may be indicated using RRC signaling.

The mechanisms described herein facilitate cross-FFP scheduling and HARQ feedback in a way that promotes efficient use of network resources in a shared frequency band. For example, the mechanisms described herein may allow a UE flexibility for HARQ transmissions in cross-FFP communication scenarios such that the UE may either initiate a COT or share a BS COT to communicate ACK/NACKs. Further, the BS may update the configuration of the UE using RRC signaling based on network conditions or other parameters. For example, the mechanisms provided herein may improve the chances an ACK/NACK is successfully received by the BS, and may also allow the UE to initiate a COT to use the network resources if the BS fails to initiate a COT.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IOT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (COMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time-stringent communications with ultra-reliable and redundant links for time-stringent devices, such as the UE 115*e*. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into transmission time intervals (TTIs). In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as a RRC connection. When the UE 115 is actively exchanging data with the BS 105, the UE 115 is in a RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel. The shared channel may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

In some aspects, the TXOPs may be periodic, and may be associated with fixed frame periods (FFPs). Each of the BS 105 and the UE 115 may be configured with FFPs. The FFPs of the BS 105 may be different from the FFPs of the UE 115. For example, the FFPs of the BS 105 may be offset or staggered relative to the FFPs of the UE 115. In some aspects, if the BS 105 and/or the UE 115 performs a RRC that results in a pass, the BS 105 or the UE 115 may acquire a channel occupancy time (COT) in a FFP. For example, if the BS 105 acquires a COT in an FFP, the BS 105 may schedule DL and/or UL communications in the COT. The BS 105 may schedule the DL and/or UL communications by transmitting a DCI in the COT. Further, in some aspects, the BS 105 may schedule DL and/or UL communications for a different FFP subsequent to the FFP in which the scheduling DCI was transmitted. This type of scheduling may be referred to as cross-FFP scheduling.

Figure 2:
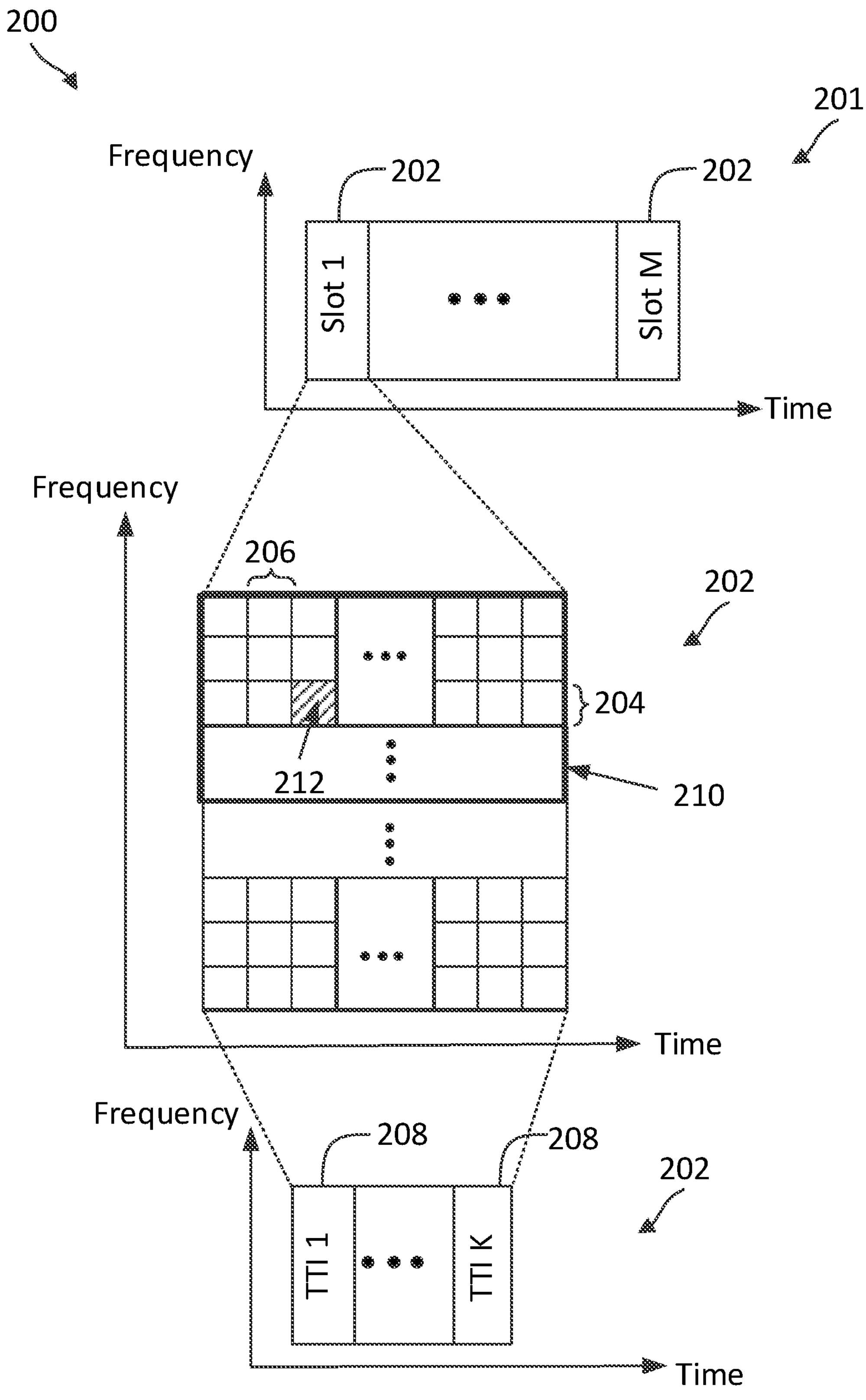
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or TTIs 208. Each slot 202 may be time-partitioned into K number of TTIs 208. Each TTI 208 may include one or more symbols 206. The TTIs 208 in a slot 202 may have variable lengths. For example, when a slot 202 includes N number of symbols 206, a TTI 208 may have a length between one symbol 206 and (N−1) symbols 206. In some aspects, a TTI 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
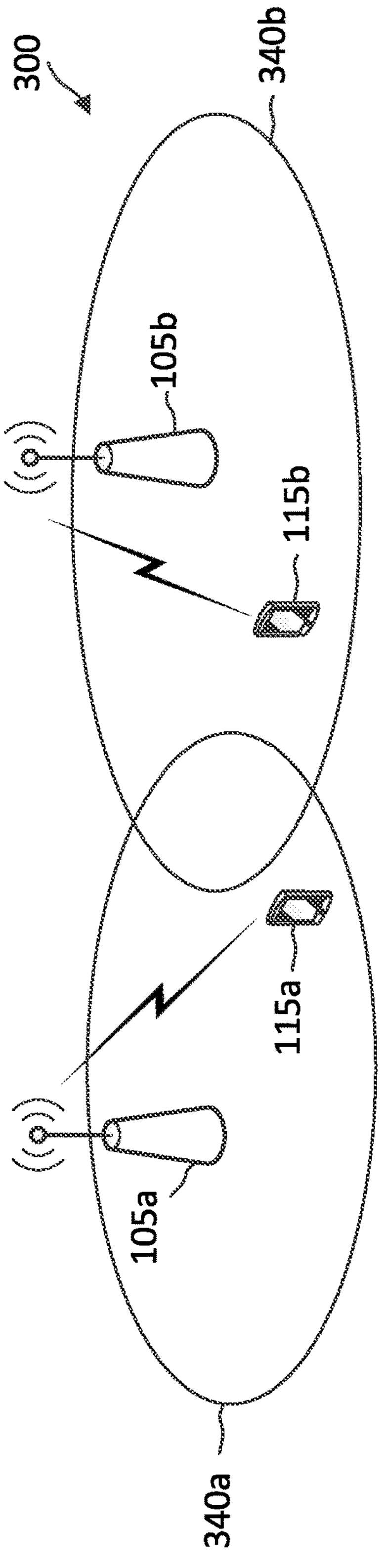
FIG. 3A illustrates an example of a wireless communications network that supports medium sharing across multiple network operating entities according to some aspects of the present disclosure.
Figure 3B:
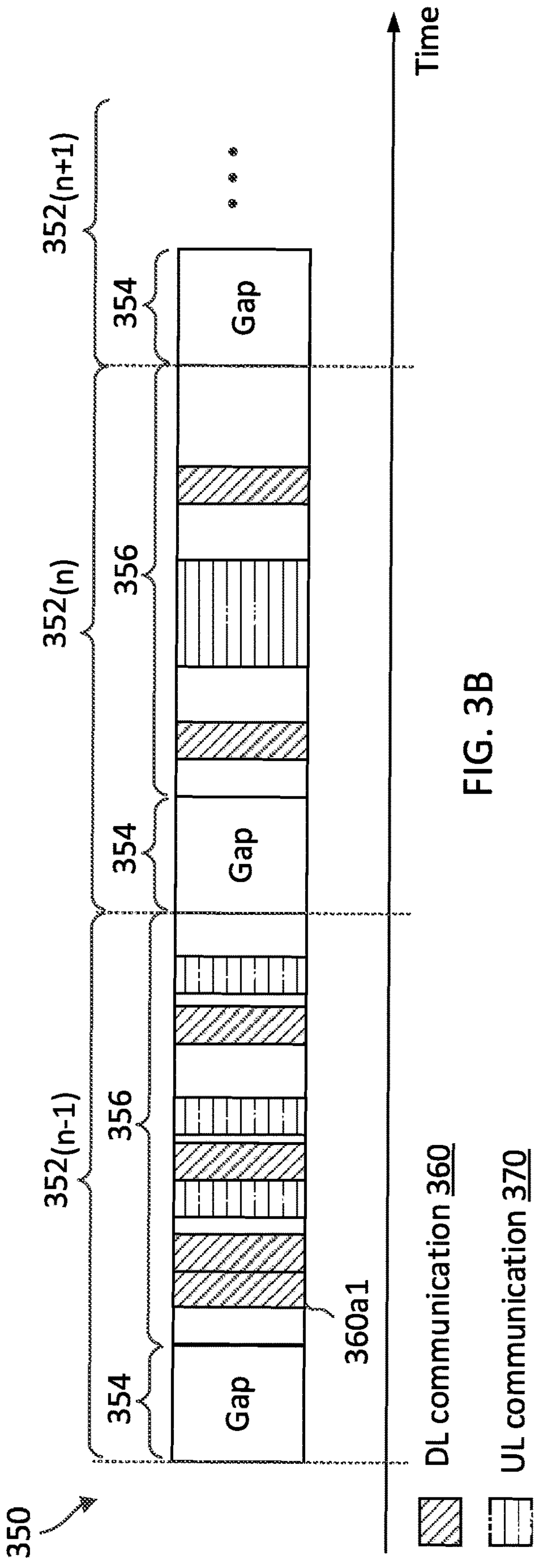
FIG. 3B illustrates a frame-based equipment (FBE) communication scheme according to some aspects of the present disclosure.

FIGS. 3A and 3B collectively illustrate FBE-based communications over a radio frequency channel (e.g., in a shared radio frequency band or an unlicensed band) for communication. FIG. 3A illustrates an example of a wireless communications network 300 that supports medium sharing across multiple network operating entities according to some aspects of the present disclosure. The network 300 may correspond to a portion of the network 100. FIG. 3A illustrates two BSs 105 (shown as BS **105*a* and BS 105*b*) and two UEs 115 (shown as UE 115*a* and UE 115*b*) for purposes of simplicity of discussion, though it will be recognized that aspects of the present disclosure may scale to many more UEs 115 and/or BSs 105. The BSs 105 and the UEs 115 may be similar to the BSs 105 and the UEs 115 of FIG. 1. FIG. 3B illustrates an FBE communication scheme 350 according to some aspects of the present disclosure. The BS 105 and the UE 115 may communicate with each other as shown in the scheme 350. In FIG. 3B**, the x-axis represents time in some arbitrary units, and the y-axis represents frequency in some arbitrary units.

Referring to FIG. 3A, in the network 300, the BS **105*a* serves the UE 115*a* in a serving cell or a coverage area 340*a*, while the BS 105*b* serves the UE 115*b* in a serving cell or a coverage area 340*b*. The BS 105*a* and the BS 105*b* may communicate with the UE 115*a* and the UE 115*b* in the same frequency channel (e.g., the frequency band 302 of FIG. 3B), respectively. In some instances, the BS 105*a* and the BS 105*b* may be operated by different network operating entities. In some other instances, the BS 105*a* and the BS 105*b* may be operated by different network operating entities. In some instances, the BS 105*a* and the BS 105*b* may utilize the same RAT (e.g., NR-based technology or WiFi-based technology) for communications with the UE 115*a* and the UE 115*b*, respectively. In some other instances, the BS 105*a* and the BS 105*b* use different RATs for communications with the UE 115*a* and the UE 115*b*, respectively. For example, the BS 105*a* and the UE 115*a* may utilize an NR-based technology for communication, while the BS 105*b* and the UE 115*b* may utilize WiFi-based technology communication. In general, the BS 105*a* and the BS 105*b* may be operated by the same network operating entities or different network operating entities and may utilize the same RAT or different RATs for communications in the network 300. The BS 105*a*, the BS 105*b*, the UE 115*a*, and the UE 115*b* may share access to the channel using an FBE-based contention mode as shown in the FBE communication scheme 350**.

Referring to FIG. 3B, the scheme 350 partitions the frequency band 302 into a plurality of frame periods 352 (shown as $\mathbf{352}_{(n-1)}$, $\mathbf{352}_{(n)}$, and $\mathbf{352}_{(n+1)}$. Each frame period 352 includes a contention or gap period 354 and a transmission period 356. The frame period 352 may have a resource structure as shown in the radio frame structure 200. In some instances, each frame period 352 may include one or more slots similar to the slots 202. In some instances, each frame period 352 may include one or more symbols similar to the symbols 206. The starting time and the duration of the frame periods 352 and the gap periods 354 are predetermined. Additionally, each frame period 352 may have the same duration. Similarly, each gap period 354 may have the same duration. Thus, the frame periods 352 may also be referred to as fixed frame periods (FFPs). In some other instances, the frame periods 352 may be referred to as COTs. In some aspects, a gap period 354 may have a minimum duration of 5 percent (%) of the total time frame period 352 according to some regulations.

A node (e.g., the BS 105*a* or the BS 105*b*) interested in using a frame period 352 for communication may contend for the channel during the corresponding gap period 354, for example, by performing an LBT to determine whether another node may have reserved the same frame period 352. If the LBT is successful, the node may transmit an indication of a reservation for the frame period 352 so that other nodes may refrain from using the same frame period 352. The LBT can be based on energy detection or signal detection. The reservation indication can be a predetermine sequence or waveform or any suitable signal. If the LBT is unsuccessful, the node may back off until the start of a next gap period 354, where the node may attempt another contention during the gap period 354.

Figure 4:
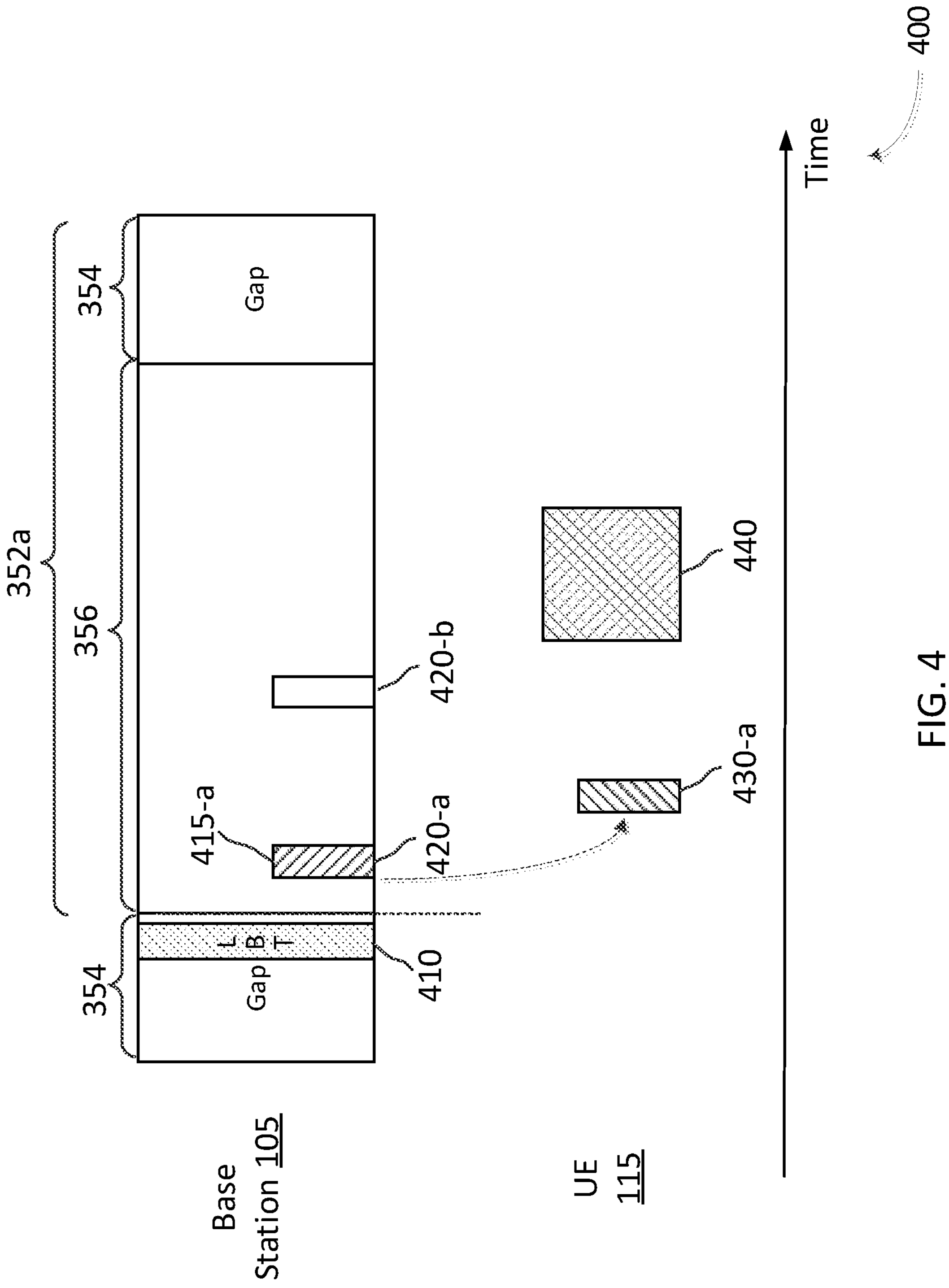
FIG. 4 illustrates an FBE communication scheduling/transmission configuration according to some aspects of the present disclosure.

While FIG. 3B illustrates a gap period 354 located at the beginning of a frame period 352, in some instances, the gap period 354 can be located at the end of a frame period 352, where the gap period may be used for contention for a next frame period (see, e.g., FIG. 4).

In some aspects, each frame period 352 may have the same duration. In some aspects, the duration of a frame period 352 may be a factor of a reference duration. The reference duration may be twice the duration of a radio frame. For instance, for a 10 ms radio frame, a frame period 352 may have a duration of about 1 ms, 2 ms, 2.5 ms, 4 ms, 5 ms, 10 ms, or 20 ms. In an example, a frame period field may have a length of about 3 bits, where a value of 0 may indicate a duration of 1 ms, a value of 1 may indicate a duration of 2 ms, a value of 2 may indicate a duration of 2.5 ms, a value of 3 may indicate a duration of 4 ms, a value of 4 may indicate a duration of 5 ms, a value of 5 may indicate a duration of 10 ms, and a value of 6 may indicate a duration of 20 ms. When a radio frame has a duration of 10 ms, each radio frame may be aligned to the start of a frame period 352 for a frame period 352 duration of 1 ms, 2 ms, 2.5 ms, 4 ms, 5 ms, or 10 ms. For a frame period 352 duration of 20 ms, every other radio frame may align to the start of a frame period 352. In some other instances, the reference duration may be about 40 ms, 50 ms, 60 ms, 80 ms, 100 ms, or any suitable integer multiples of a radio frame duration.

In some aspects, the duration of a gap period 354 can be in units of symbols (e.g., the symbols 206). As discussed above, the gap period 354 may be configured to satisfy a certain regulation with a minimum of 5% of a total frame period. Thus, the gap period 354 may include a minimum integer number of symbols that is greater than a minimum portion (e.g., 5%) of the frame period 352. For example, the duration of the gap period 354 can be computed as shown below:

$$N_{Symbols} = \text{round}\left(\frac{0.05 \times T_{frame\ period}}{T_{Symbol}}\right), \quad (1)$$

where $N_{Symbols}$ represents the number of symbols in the gap period 354, $T_{frameperiod}$ represents the duration of a frame period 352, and $T_{Symbol}$ represents the duration of a symbol. In some aspects, the minimum gap duration or the factor 5% may be configurable by the network. For instance, the factor may be 4%, 6%, or 7% or more. As an example, for a frame period 352 with a duration of about 4 ms and an SCS of about 30 kHz, the gap period 354 may include about 6 symbols. In some other instances, the gap period 354 may occupy a minimum percentage of the frame period 352 as specified by a wireless communication protocol. In some instances, the number of symbols in a gap period 354 may vary depending on the time location of the gap period 354 within a radio frame. For instance, in a certain configuration, the symbol time may be longer at every 0.5 ms.

In some aspects, the duration of a gap period 354 can be in units of slots (e.g., the slots 202). For example, the duration of the gap period 354 can be computed as shown below:

$$N_{Slots} = \text{round}\left(\frac{0.05 \times T_{frame\ period}}{T_{Slot}}\right), \quad (2)$$

where $N_{Slots}$ represents the number of slots in the gap period 354, $T_{frameperiod}$ represents the duration of a frame period 352, and $T_{Slot}$ represents the duration of a slot.

In some aspects, a duration of the gap period 354 can be determined based on the duration of the frame period 352. As discussed, the gap period 354 may have a duration that is at least a certain factor (e.g., about 5%) of the duration of the frame period 352. Accordingly, the UE 115 may compute the duration of the gap period 354 using the equation (1) or (2) discussed above.

In the illustrated example of FIG. 3B, the BS 105*a* and the BS 105*b* may contend for the frame periods $\mathbf{352}_{(n-1)}$, $\mathbf{352}_{(n)}$, and $\mathbf{352}_{(n+1)}$ during corresponding gap periods 354. The BS 105*a* may win the contention for the frame period $\mathbf{352}_{(n-1)}$ and $\mathbf{352}_{(n+1)}$, while the BS 105*b* may win the contention for the frame period 352(*n*). After winning a contention, the BS 105*a* or the BS 105*b* may schedule DL communication(s) 360 and/or UL communication(s) 370 with the UE 115*a* or the UE 115*b*, respectively, within the corresponding non-gap duration or transmission period 356. The DL communication 360 may include DL control information (e.g., PDCCH control information) and/or DL data (e.g., PDSCH data). The UL communication 370 may include UL control information (e.g., PUCCH control information), PRACH signals, random access messages, periodic-sounding reference signals (p-SRSs), and/or UL data (e.g., PUSCH data). For instance, the BS 105*a* may transmit a DL scheduling grant (e.g., PDCCH scheduling DCI) or a UL scheduling grant (e.g., PDCCH scheduling DCI) for a DL communication 360 or an UL communication 370 with the UE 115*a* during the frame period $\mathbf{352}_{(n-1)}$. The UE 115*a* may monitor for scheduling grants from the BS 105*a* and transmit UL communication 370 to the BS 105*a* or receive DL communication 360 from the BS 105*a* according to the grants. In some aspects, the UE 115*a* may perform a category 2 (CAT2) LBT prior to transmitting the UL communication 370. A CAT2 LBT may refer to a one-shot LBT with no random backoff.

In some aspects, the BS 105*a* may transmit a PDCCH signal (shown as 360*al*) at or near the beginning of the transmission period 356 to signal to the UE 115*a* that the BS 105*a* has won the contention for the frame period $\mathbf{352}_{(n-1)}$. In some instances, the PDCCH signal may include downlink control information (DCI). In some instances, the DCI includes a group common-PDCCH (GC-PDCCH) DCI signaling to a group of UEs served by the BS 105*a* that the BS 105*a* has won the contention for the frame period $\mathbf{352}_{(n-1)}$ so the UEs may monitor for PDCCH from the BS 105*a*. In some instances, the GC-PDCCH may include a slot format indication (SFI) indicating transmission directions assigned to symbols within the transmission period 356 of the frame period $\mathbf{352}_{(n-1)}$. The indication of the BS 350*a* winning access to the frame period $\mathbf{352}_{(n-1)}$ may generally be referred to as a COT indication.

In some aspects, the BS 105*a* may configure the UE 115*a* with configured grants or configured resources for configured UL transmissions. The configured grants or resources may be periodic. When a configured resource or grant is within the transmission period 356 of the frame period $\mathbf{352}_{(n-1)}$, the UE 115*a* may monitor for a COT indication from the BS 105*a* during the frame period $\mathbf{352}_{(n-1)}$. Upon detecting a COT indication from the BS 105*a*, the UE 115*a* may transmit using the configured grant resource in the frame period $\mathbf{352}_{(n-1)}$.

In some aspects of the present disclosure, the UE 115*a* may determine based on the DCI 360*a*1 that the UE 115*a* can transmit an uplink communication to the BS 105*a* during the frame period $\mathbf{352}_{(n-1)}$. In some instances, the BS 105*a* transmits the DCI 360*al* with content indicating that there is no associated physical downlink shared channel (PDSCH) communication scheduled. The UE 115*a* can process the DCI and determine, based on no PDSCH communication being scheduled by the DCI 360*al*, that the UE 105*a* can transmit an uplink communication in the FFP. If the UE 115*a* is operating in idle mode, then the uplink communication(s) 370 can include a physical random access channel (P-RACH) communication (e.g., a random access preamble (Msg1), a connection request (Msg3), a MsgA, etc.) and/or another type of uplink communication. If the UE 115*a* is operating in connected mode, the uplink communication(s) 370 can include a physical uplink control channel (PUCCH) communication, a physical uplink shared channel (PUSCH) communication, a sounding reference signal (SRS), and/or another type of uplink communication. In some instances, the DCI 360*al* uses an existing DCI format (e.g., 0_1, 0_2, 1_2, etc.). In some instances, the DCI 360*al* indicates a PDSCH communication is not scheduled for the UE 115*a* using one or more fields in the DCI 360*al*. For example, a frequency domain resource allocation (FDRA) field of the DCI 360*al* can indicate that a PDSCH communication is not scheduled (e.g., all zeros for RA Type 0, all ones for RA Type 1, etc.).

Once the BS 105*a* or the BS 105*b* won the contention for a frame period 352, the frame period 352 is used exclusively by the BS 105*a* or the BS 105*b* that won the contention. Thus, the BS 105*a* or the BS 105*b* can leave an idle period (shown as blank boxes) with no transmission in the frame period 352. When operating in the FBE mode, another node may not occupy the channel during the idle period since contention may only occur during the gap periods 354.

As discussed above, when operating in an FBE communication mode, the frame periods 352 and the gap periods 354 are predetermined are known prior to communications in the FBE mode. Accordingly, the present disclosure provides techniques to signal FBE structures for FBE communication over a shared radio frequency band. The present disclosure also provides techniques to enable UEs (e.g., the UEs 115 and/or 800) to access a network (e.g., the networks 100 and/or 300) when the network operates in an FBE mode.

FIG. 4 illustrates an FBE communication scheduling/transmission configuration 400 according to some aspects of the present disclosure. As shown, the BS 105 performs an LBT 410 to contend for the frame period 352*a*. In the illustrated example, the BS 105 wins the contention for the frame period 352*a* and, therefore, can occupy the frame period 352*a*. During the transmission period 356 of the frame period 352*a* the BS transmits downlink control information (DCI) 415-*a* in a search space of the shared radio frequency band. In some instances, at block 1110 the BS transmits the DCI 415-*a* masked with a system information radio network temporary identifier (SI-RNTI) (e.g., for an idle mode UE) or masked with a cell radio network temporary identifier (C-RNTI) (e.g., for a connected mode UE). In some instances, the BS transmits the DCI 415-*a* in DCI format 1_0 masked with SI-RNTI. In some instances, the BS transmits the DCI in DCI format 1_2 masked with C-RNTI or in DCI format 0_2 masked with the C-RNTI.

In some instances, the BS transmits the DCI 415-*a* based on one or more predefined resource candidates 420. The BS may decide to transmit the DCI 415-*a* using one or more, including all, of the resource candidates. For example, in FIG. 4, two candidate resource locations 420-*a* and 420-*b* are illustrated as being available for transmitting the DCI, but only resource 420-*a* is used by the BS 105 for transmitting the DCI 415-*a*. The resource candidates may be based on a CORESET, search space (common, group-specific, and/or UE-specific), time resources, frequency resources, aggregation level, and/or combinations thereof. In some instances, aspects of the search space/CORESET configuration scheme 500 discussed below with respect to FIG. 5 are utilized. The predefined resource candidates may be set by a network specification, programmed in the BS's memory, and/or combinations thereof. The predefined resource candidates may be determined by the BS and communicated to one or more UEs through a RRC-configuration, a SIB, a MIB, and/or other signaling. In some instances, the BS transmits the DCI 415-*a* in a common search space (CSS) of a physical downlink control channel (PDCCH). In some instances, the common search space is a Type 0 CSS. In some instances, the BS transmits the DCI 415-*a* in a user-equipment specific search space (USS) of a PDCCH.

The UE 115 monitors the search space of the shared radio frequency band for downlink communications from the BS operating in the FBE mode. In some instances, the UE 115 operates in an idle mode while monitoring for the downlink communication. In some instances, the UE 115 operates in a RRC connected mode while monitoring for the downlink communication. The UE 115 can monitor for the downlink communications based on one or more predefined resource candidates, such as the resource candidates discussed above. For example, the UE 115 can monitor for the downlink communication in a CSS and/or a USS of a PDCCH.

Based on the monitoring, the UE 115 can receive the DCI 415-*a* as indicated by communication 430-*a*. The UE 115 may receive the DCI 415-*a* masked with SI-RNTI (e.g., for an idle mode UE) or masked with C-RNTI (e.g., for a connected mode UE). In some instances, the UE 115 receives the DCI 415-*a* in DCI format 1_0 masked with SI-RNTI. In some instances, the UE 115 receives the DCI 415-*a* in DCI format 1_2 masked with C-RNTI or in DCI format 0_2 masked with the C-RNTI.

In some instances, the DCI 415-*a* does not schedule a PDSCH communication for the UE 115. In some instances, the BS 105 indicates that a PDSCH communication is not scheduled for the UE 115 using on one or more fields in the DCI 415-*a*. For example, the value of one or more fields of the DCI 415-*a* may indicate that a PDSCH communication is not scheduled for a UE 115. In some instances, the one or more fields includes a frequency domain resource allocation (FDRA) field. In this regard, the values of the FDRA field can indicate that the PDSCH communication is not scheduled for the UE 115 (e.g., all zeros for RA Type 0, all ones for RA Type 1, etc.). In some instances, a combination of values across multiple fields of the DCI 415-*a* can indicate that the PDSCH communication is not scheduled for the UE 115. In this regard, the values of the multiple fields can correspond to a set of values that indicate to the UE 115 that a PDSCH communication is not scheduled for the UE 115.

The UE 115 can determine, based on the DCI 415-*a* received at 430-*a*, that the DCI 415-*a* does not schedule a PDSCH communication for the UE 115. In some instances, the UE 115 determines the DCI does not schedule the PDSCH communication for the UE 115 based on one or more fields in the DCI as discussed above. In some instances, the UE 115 uses the determination that the DCI 415-*a* does not schedule a PDSCH communication for the UE 115 to determine that the UE 115 can transmit an uplink communication 440 to the BS in the frame period 352*a*. In some instances, the uplink communication 440 is a physical random access channel (P-RACH) communication (e.g., a random access preamble (Msg1), a connection request (Msg3), a MsgA, etc.). In some instances, the uplink communication 440 is a physical uplink control channel (PUCCH) communication, a physical uplink shared channel (PUSCH) communication, a sounding reference signal (SRS), and/or another type of uplink communication. In this manner, the transmission of the DCI 415-*a* that does not schedule a PDSCH communication can be utilized to validate uplink communication(s) by the UE 115 to the BS 105.

In some aspects, a BS 105 may be configured to transmit control information (e.g., downlink control information (DCI)) in a first fixed frame period (FFP), where the DCI schedules a downlink (DL) communication in a subsequent second FFP. However, because the BS has not yet acquired a channel occupancy time (COT) in the second FFP, it is possible that the BS does not acquire the COT in the second FFP. Thus, the BS may not transmit the DL communication in the second FFP. From the UE perspective, if the UE does not detect the scheduled DL communication in the second FFP, it may not be known if the detection failure is a result of a failure to decode the DL communication, or if the BS did not transmit the DL communication. Accordingly, whether the UE should transmit a non-acknowledgement (NACK) indicating the failure to detect/decode may be unknown. Further, whether the UE can transmit an acknowledgement (ACK) or a NACK based on a BS-initiated COT or a UE-initiated COT may also be unknown. This uncertainty may result in reduced efficiency and network performance. For example, if the UE transmits the ACK/NACK based on a BS-initiated COT timeline and the BS does not initiate the COT, an ACK/NACK transmitted by the UE in a shared BS COT may not be received by the BS. Further, the UE may forgo an opportunity to initiate a COT to transmit the ACK/NACK based on a BS COT. The present disclosure describes mechanisms whereby the UE can determine to transmit an ACK/NACK in a UE-initiated COT or a BS-initiated COT based on at least one of a DL signal detection or a content of the scheduling DCI.

Figures 5A, 5B:
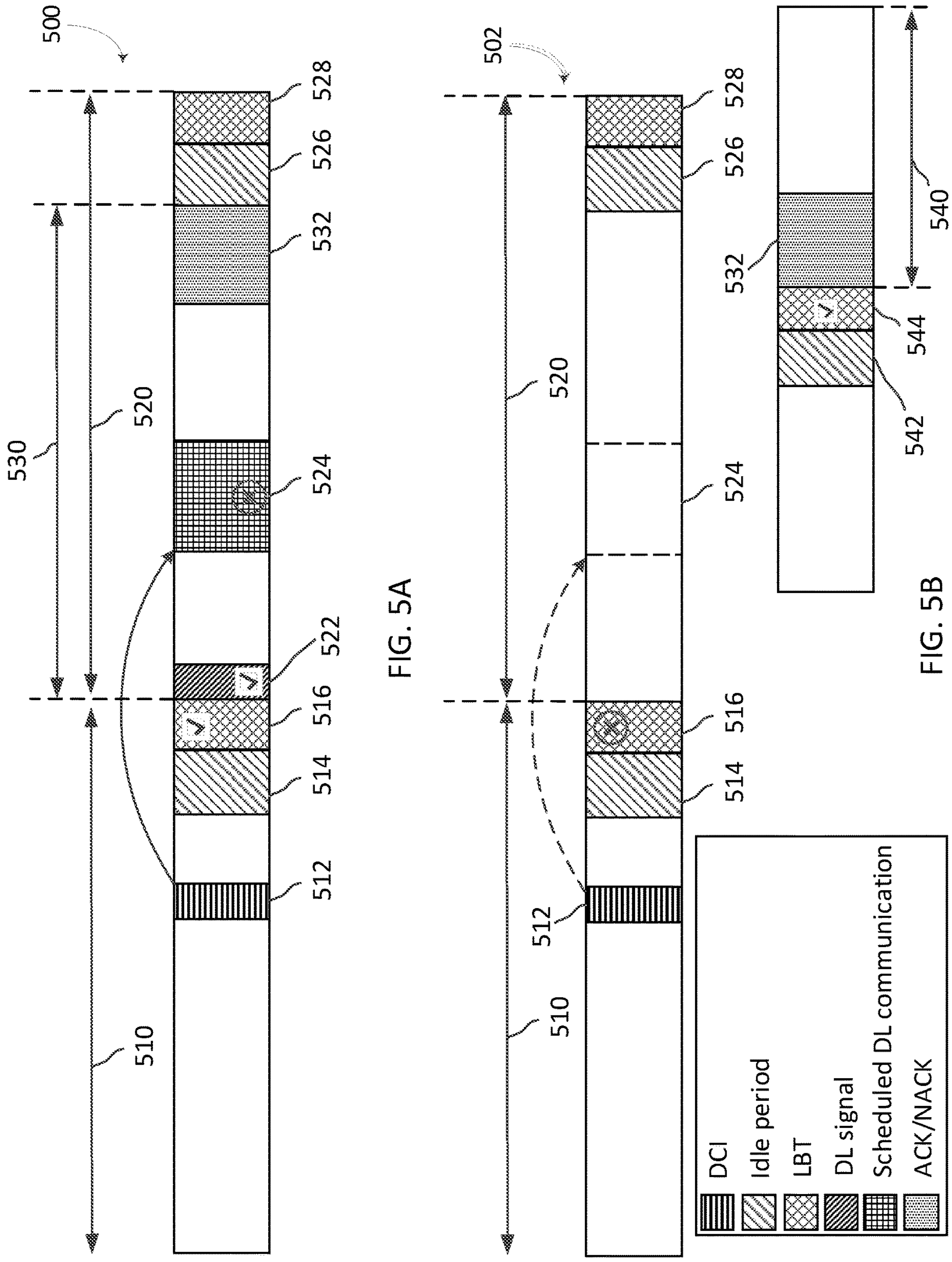
FIG. 5A illustrates a cross-fixed frame period (FFP) hybrid automatic repeat request (HARQ) transmission scheme according to some aspects of the present disclosure.
FIG. 5B illustrates a cross-FFP HARQ transmission scheme according to some aspects of the present disclosure.

FIGS. 5A and 5B illustrate cross-fixed frame period (FFP) hybrid automatic repeat request (HARQ) communication schemes 500, 502 according to some aspects of the present disclosure. The schemes 500, 502 may be performed by a BS, such as one of the BSs 105 in the network 100, and a UE, such as one of the UEs 115 in the network 100. In each of the schemes 500, 502, the BS and UE are operating in FBE mode in a shared frequency band (e.g., NR-U). The BS transmits, and the UE receives, a DCI 512 in a first FFP 510 to schedule a DL communication in a second FFP 520. The second FFP 520 may immediately follow the first FFP 510 or be spaced from the first FFP 510 by one or more intermediate FFPs or other time periods. In each of the schemes 500, 502, the UE may not decode or detect the scheduled DL communication in the second FFP 520. The cause of the failed detection may be a UE error/interference (as shown in FIG. 5A), or a failure of the BS to acquire a COT in the second FFP such that the BS does not transmit the scheduled DL communication (as shown in FIG. 5B). The schemes 500, 502 provide mechanisms for transmitting HARQ feedback (e.g., ACK/NACK) to the BS when the cause of the failed DL detection may be unknown to the UE.

In both schemes 500, 502, the BS transmits, and the UE receives, a DCI 512 in a first FFP 510. The DCI 512 indicates a scheduled DL communication 524 in a second FFP 520 subsequent to the first FFP 510. For example, in some aspects, the UE may receive the DCI 512 in a PDCCH transmitted by the BS in a first COT associated with the first FFP 510. The DCI 512 may indicate a PDSCH scheduled in a second FFP 520, where the PDSCH carries the DL communication 524. The BS may transmit the DCI 512 masked with a system information radio network temporary identifier (SI-RNTI) (e.g., for an idle mode UE) or masked with a cell radio network temporary identifier (C-RNTI) (e.g., for a connected mode UE). In some instances, the BS transmits the DCI 512 in DCI format 1_0, 1_1, or 1_2 masked with C-RNTI. At the end of the first FFP 510, the BS performs an LBT 516 following an idle period or gap period 514. In some aspects, the BS may perform an LBT CAT 2. Based on the LBT 516, the BS may or may not acquire a COT in the second FFP 520. At the end of the second FFP 520, the BS performs a further LBT 528 following a further idle period or gap period 526.

Referring to the scheme 500 of FIG. 5A, if the LBT 516 passes, as indicated by the check mark in the LBT 516, the BS may transmit a DL signal 522 in a BS COT 530 associated with the second FFP 520. The DL signal 522 may indicate to the UE that the BS has acquired or won the COT 530. In some aspects, the DL signal 522 may include a control signal, such as a DL control signal. For example, the DL signal 522 may include a DCI carried in a PDCCH. In other aspects, the DL signal 522 may include a DL reference signal. The DL signal 522 may indicate, to the UE, that the BS has acquired the COT 530 in the second FFP 520. In the scheme 500, the UE successfully detects the DL signal 522, as shown by the checkmark in the DL signal 522. Accordingly, it may be known to the UE that the BS has acquired or initiated the BS COT 530. However, the UE may fail to detect or decode the scheduled DL communication 524, as shown by the "X" in the DL communication 524. Accordingly, the UE may prepare to transmit a NACK to the BS indicating that the DL communication was not detected. In other instances, the UE may successfully detect and decode the scheduled DL communication 524, in which case the UE may prepare to transmit an ACK to the BS.

In the scheme 500 of FIG. 5A, the UE may be configured to transmit the NACK 532 based on detecting or failing to detect the DL signal 522. For example, if the UE detects the DL signal 522 and the second FFP 520, the UE may assume or determine that the BS has initiated the COT 530, and therefore transmits the ACK/NACK 532 based on the BS COT 530, as shown in FIG. 5A.

As shown in the scheme 502 of FIG. 5B, if the LBT 516 performed by the BS fails, the BS does not transmit the DL communication 524 in the second FFP 520. Further, the BS does not transmit the DL signal 522 in the second FFP 520.

Accordingly, the UE may determine or assume that the BS has not acquired a COT in the second FFP 520. The UE may be configured to acquire a UE COT 540 by performing an LBT 544 after an idle period 542 and transmit the NACK 532 in a UE COT 540. Thus, in the schemes 500, 502, the UE determines whether to transmit the ACK/NACK 532 in either a BS COT 530 or a UE COT 540, based on a detection or failure to detect a DL signal 522 in the second FFP 520.

Figures 6A, 6B:
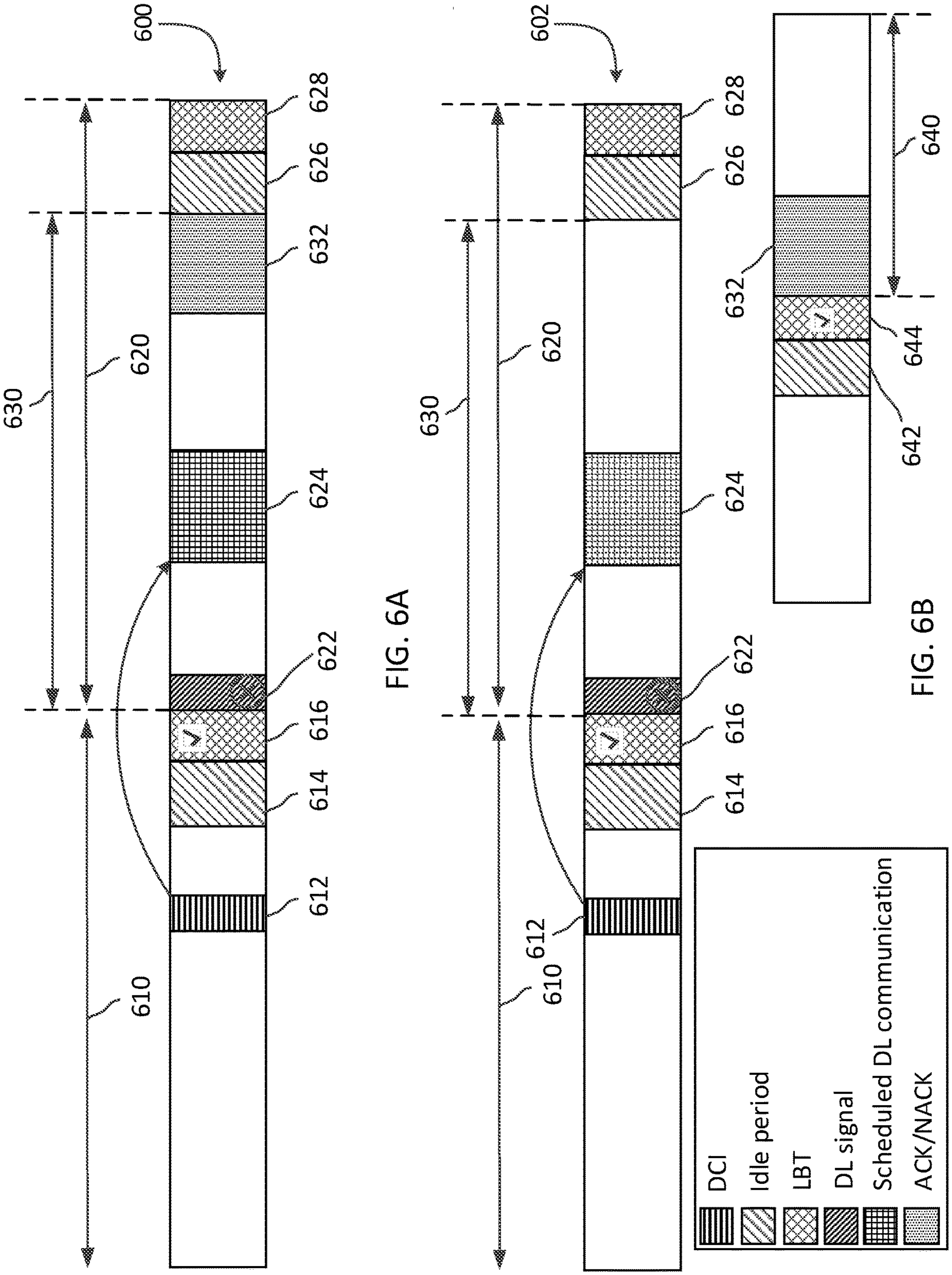
FIG. 6A illustrates a cross-FFP HARQ transmission scheme according to some aspects of the present disclosure.
FIG. 6B illustrates a cross-FFP HARQ transmission scheme according to some aspects of the present disclosure.

In another aspect, a UE may be configured to transmit an ACK/NACK in either a BS COT or a UE COT based on the content of the scheduling DCI. For example, the UE may determine whether to transmit an ACK/NACK in a BS COT or a UE COT based on an indication in the DCI. The DCI may indicate the UE to share a BS COT in the second FFP, or to initiate a UE COT in the second FFP. For example, FIG. 6A illustrates a scheme 600 for cross-FFP HARQ communication based on the content of a scheduling DCI, according to aspects of the present disclosure. As similarly described above with respect to FIGS. 5A and 5B, the BS transmits, and the UE receives, a DCI 612 in a first FFP 610. The DCI 612 indicates a scheduled DL communication 624 in a second FFP 620 subsequent to the first FFP 610. The second FFP 620 may immediately follow the first FFP 610 or be spaced from the first FFP 610 by one or more intermediate FFPs or other time periods. In some aspects, the UE may receive the DCI 612 in a PDCCH transmitted by the BS in a first COT associated with the first FFP 610. The DCI 612 may indicate a PDSCH scheduled in a second FFP 620, where the PDSCH carries the DL communication 624. The BS may transmit the DCI 612 masked with a SI-RNTI or a C-RNTI. In some instances, the BS transmits the DCI 612 in DCI format 1_0, 1_1, or 1_2 masked with C-RNTI. At the end of the first FFP 610, the BS performs an LBT 616 following an idle period or gap period 614. In some aspects, the BS may perform an LBT CAT 2. Based on the LBT 616, the BS may acquire a COT 630 in the second FFP 620. At the end of the second FFP 620, the BS performs a further LBT 628 following a further idle period or gap period 626.

In the scheme 600, the BS transmits a DL signal 622 based on the LBT 616 passing. As explained above, the DL signal 622 may indicate to the UE that the BS has acquired or won the COT 630. In some aspects, the DL signal 622 may include a control signal, such as a DL control signal. For example, the DL signal 622 may include a DCI carried in a PDCCH. In other aspects, the DL signal 622 may include a DL reference signal. The DL signal 622 may indicate, to the UE, that the BS has acquired the COT 630 in the second FFP 620. In the scheme 600, the UE fails to detect the DL signal 622, as shown by the "X" in the DL signal 622. Further, the UE may fail to detect the scheduled DL communication 624. In other instances, the UE may successfully detect and decode the scheduled DL communication 624. In the scheme 600, the UE is configured to transmit a ACK/NACK 632 in the BS COT 630 even though the DL signal 622 was not detected. The UE may determine to transmit the ACK/NACK 632 in the BS COT 630 based on an indication in the DCI 612. The DCI 612 indicates the UE to share the BS COT 630 in the second FFP 620.

In another aspect, the UE may transmit the ACK/NACK 632 in a UE COT based on both an indication in the DCI 612 and a detection of or failure to detect the DL signal 622 in the second FFP 620. For example, in the scheme 602 shown in FIG. 6B, the BS may indicate, via the DCI 612, the UE to share a BS COT 630 in the second FFP 620. However, the UE may fail to detect the DL signal 622 in the second FFP 620. Accordingly, the UE may determine or assume that the BS has not acquired the COT 630 in the second FFP 620. In some aspects, the UE is configured to initiate a UE COT 640 by performing a LBT 644 after an idle period 642, and transmit the ACK/NACK 632 in the UE COT 640 based on the failure to detect the DL signal 622, even though the DCI 612 indicates the UE to share the BS COT 630. Accordingly, in some aspects, the indication in the DCI 612 to either share a BS COT in the second FFP or initiate a UE COT may be used by the UE as a default rule or configuration for transmitting ACK/NACK in the second FFP. The UE may transmit an ACK/NACK contrary to the default rule or configuration in certain situations based on either detecting or failing to detect the DL signal 622.

Figure 7:
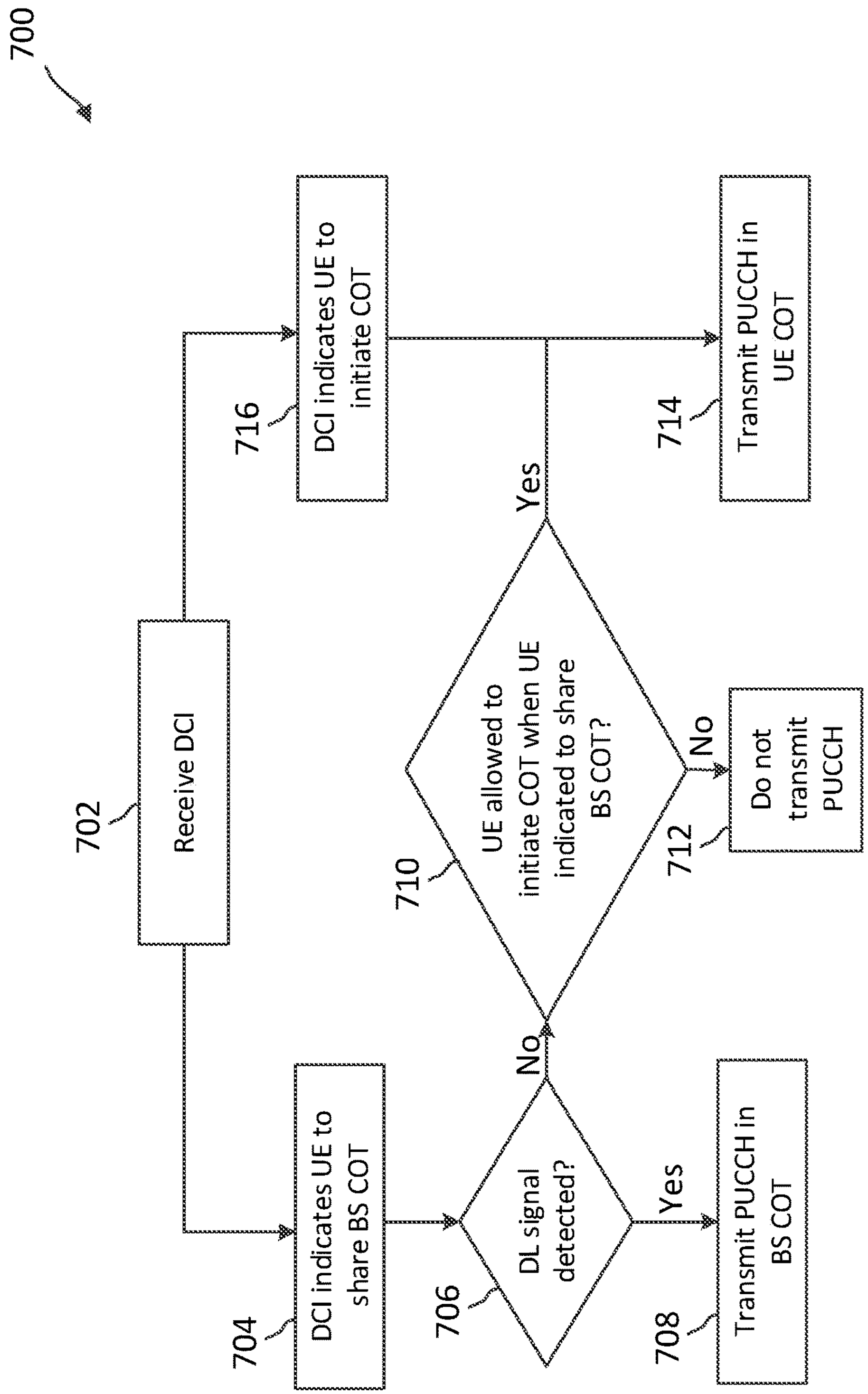
FIG. 7 is a flow diagram for a cross-FFP HARQ transmission scheme according to some aspects of the present disclosure.
Figure 8:
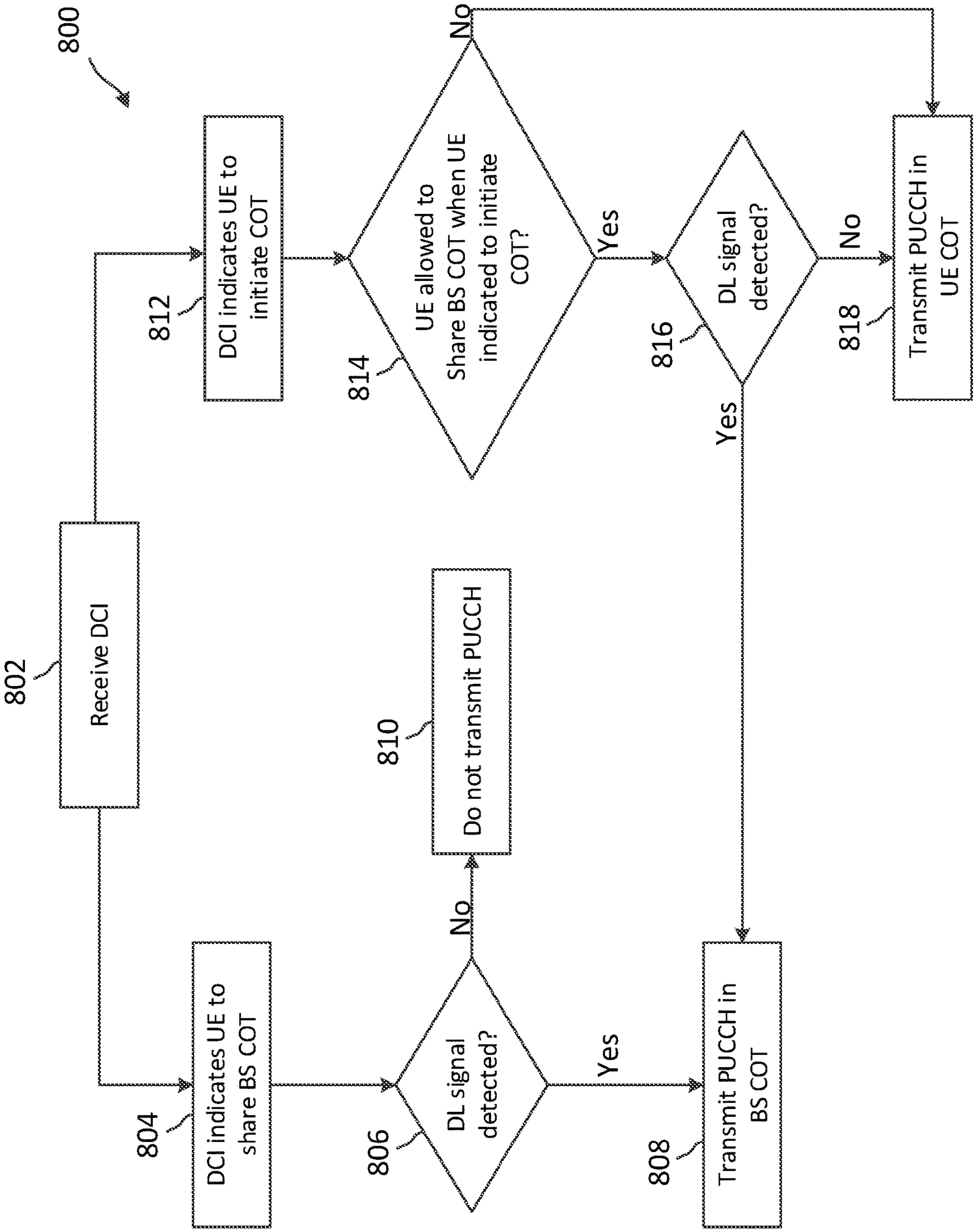
FIG. 8 is a flow diagram for a cross-FFP HARQ transmission scheme according to some aspects of the present disclosure.

As described above, in some aspects, the UE may be configured to transmit an ACK/NACK for a cross-FFP scheduled DL communication based on a detection of a DL signal in the second FFP, on an indication in the DCI, or a combination of those factors. Further, the configuration or rule used by the UE to determine whether to transmit the ACK/NACK based on a UE COT or a BS COT may be configured and/or updated by the BS from time to time. For example, the BS may use RRC signaling to indicate one or more aspects of the ACK/NACK transmission scheduling for the UE. In some aspects, the UE may transmit the ACK/NACK in either a UE COT or a BS COT based on a combination of the content/indication in the scheduling DCI, a detection of a DL signal in the second FFP indicating that the BS has acquired a COT in the second FFP, and a RRC configuration. In this regard, FIGS. 7 and 8 illustrate schemes 700, 800 for communicating HARQ feedback in a cross-FFP DL scheduling scenario. In the schemes 700, 800, RRC signaling may be used by the UE to determine whether and how to transmit ACK/NACK for a cross-FFP scheduled DL communication. Aspects of the schemes 700, 800 may be performed by a UE, such as one of the UEs 115 of the network 100, and/or by a BS, such as one of the BSs 105 in the network 100.

Referring to the scheme 700 of FIG. 7, at block 702 the UE receives, from a BS, a DCI scheduling a DL communication. The UE may receive the DCI in a first FFP, and the DCI may indicate a scheduled DL communication in a second FFP subsequent to the first FFP. For example, in some aspects, the UE may receive the DCI in a PDCCH transmitted by the BS in a first COT associated with the first FFP. The DCI may indicate a PDSCH scheduled in a second FFP. In some aspects, receiving the DCI includes performing a blind decoding operation in a plurality of search spaces in a CORESET configured in the UE. In some instances, the UE receives the DCI in DCI format 1_0, 1_1, or 1_2 masked with C-RNTI.

The DCI indicates the UE to either share a BS COT (block 704), or to initiate a UE COT (block 716) in the second FFP. Referring to block 704, if the DCI indicates the UE to share a BS COT in the second FFP, the UE monitors for a DL signal in the second FFP, as shown in block 706. In some instances, the UE monitors for the DL signal based on one or more predefined resource candidates. The predefined resource candidates may be defined based on a CORESET, search space (common, group-specific, and/or UE-specific), time resources, frequency resources, aggregation level, and/or combinations thereof. The predefined resource candidates may be set by a network specification, programmed in the UE's memory, and/or combinations thereof. The predefined resource candidates may be determined by a BS and communicated to one or more UEs through a RRC-configuration, a SIB, a MIB, and/or other signaling. In some instances, the UE monitors for the DL signal in a common search space (CSS) of a physical downlink control channel (PDCCH). In some instances, the common search space is a Type 0 CSS. In some instances, the UE monitors for the DL signal in a user-equipment specific search space (USS) of a PDCCH. In another aspect, monitoring for the DL signal may include monitoring for a DL reference signal (e.g., DMRS). However, it will be understood that these DL signals and channels are merely exemplary, and that block 706 may include or involve monitoring for any other suitable signal.

If the DL signal is detected at block 706, the UE transmits the ACK/NACK in a PUCCH based on a BS COT, as shown in block 708. If the UE fails to detect the DL signal in the second FFP, the UE may determine to transmit the PUCCH based on a UE COT, or to refrain from transmitting the PUCCH, based on a RRC configuration. As shown in block 710, the RRC configuration may indicate whether the UE is enabled to initiate a UE COT if the DCI indicates the UE to share a BS COT and the UE does not detect a DL signal in the second FFP. If the UE is so enabled, the UE transmits the ACK/NACK in a PUCCH based on a UE-initiated COT in block 714. If the UE is not enabled to initiate a UE COT if the DCI indicates the UE to share a BS COT and the UE does not detect a DL signal, the UE refrains from transmitting the ACK/NACK (PUCCH) in block 712. Referring to block 716, in the scheme 700, if the DCI indicates the UE to initiate a COT in the second FFP, the UE may transmit the ACK/NACK based on the UE COT whether or not the UE detects the DL signal in the second FFP.

FIG. 8 illustrates a further scheme 800 for HARQ feedback in a cross-FFP DL scheduling scenario in which RRC signaling may be used by the UE to determine whether and how to transmit ACK/NACK for a cross-FFP scheduled DL communication. In the scheme 800, the UE may receive a RRC configuration that enables the UE to share a BS COT for transmitting an ACK/NACK even if the scheduling DCI indicates the UE to initiate a UE COT in the second FFP.

At block 802 the UE receives, from a BS, a DCI scheduling a DL communication. The UE may receive the DCI in a first FFP, and the DCI may indicate a scheduled DL communication in a second FFP subsequent to the first FFP. For example, in some aspects, the UE may receive the DCI in a PDCCH transmitted by the BS in a first COT associated with the first FFP. The DCI may indicate a PDSCH scheduled in a second FFP. In some aspects, receiving the DCI includes performing a blind decoding operation in a plurality of search spaces in a CORESET configured in the UE. In some instances, the UE receives the DCI in DCI format 1_0, 1_1, or 1_2 masked with C-RNTI.

The DCI indicates the UE to either share a BS COT (block 804), or to initiate a UE COT (block 812) in the second FFP. Referring to block 804, if the DCI indicates the UE to share a BS COT in the second FFP, the UE monitors for a DL signal in the second FFP, as shown in block 806. In some instances, the UE monitors for the DL signal based on one or more predefined resource candidates. The predefined resource candidates may be defined based on a CORESET, search space (common, group-specific, and/or UE-specific), time resources, frequency resources, aggregation level, and/or combinations thereof. The predefined resource candidates may be set by a network specification, programmed in the UE's memory, and/or combinations thereof. The predefined resource candidates may be determined by a BS and communicated to one or more UEs through a RRC-configuration, a SIB, a MIB, and/or other signaling. In some instances, the UE monitors for the DL signal in a common search space (CSS) of a physical downlink control channel (PDCCH). In some instances, the common search space is a Type 0 CSS. In some instances, the UE monitors for the DL signal in a user-equipment specific search space (USS) of a PDCCH. In another aspect, monitoring for the DL signal may include monitoring for a DL reference signal (e.g., DMRS). However, it will be understood that these DL signals and channels are merely exemplary, and that block 806 may include or involve monitoring for any other suitable signal.

If the DL signal is detected at block 806, the UE transmits the ACK/NACK in a PUCCH based on a BS COT, as shown in block 808. If the UE fails to detect the DL signal in the second FFP, the UE refrains from transmitting the PUCCH in block 810.

Referring to block 812, if the DCI indicates the UE to initiate a COT in the second FFP, the UE may determine to transmit the PUCCH in a UE COT, or to transmit the PUCCH in a BS COT, based on a RRC configuration. As shown in block 814, the RRC configuration may indicate whether the UE is enabled to share a BS COT if the DCI indicates the UE to initiate a UE COT. If the UE is so enabled, the UE may determine, based on monitoring for a DL signal in block 816, whether to transmit the PUCCH in a BS COT (block 808), or to transmit the PUCCH in a UE COT (block 818). In this regard, if the UE detects the DL signal in the second FFP and the UEis configured to share a BS COT when indicated to initiate a UE COT, the UE transmits the PUCCH in the BS COT, as shown in block 808. If the UE does not detect the DL signal, the UE transmits the PUCCH in a UE COT, as shown in block 818. If the UE is not enabled to share a BS COT when the UE is indicated to initiate a UE COT, the UE transmits the PUCCH in the UE COT, as shown in block 818.

The schemes 700, 800 shown in FIGS. 700, 800, provide a flexible or dynamic mechanism for determining cross-FFP HARQ communications between a BS and a UE. In particular, the configurations of the UE and BS for transmitting and receiving HARQ communications can be adjusted based on network conditions to improve the probability that the HARQ feedback (e.g., NACK) is successfully received by the BS, while allowing for the UE to make use of shared network resources when the BS is unable to use them. In other words, the schemes and mechanisms described herein advantageously balance the desire for reliable HARQ feedback communications and efficient use of network resources in cross-FFP communication scenarios with scheduling uncertainties.

Figure 9:
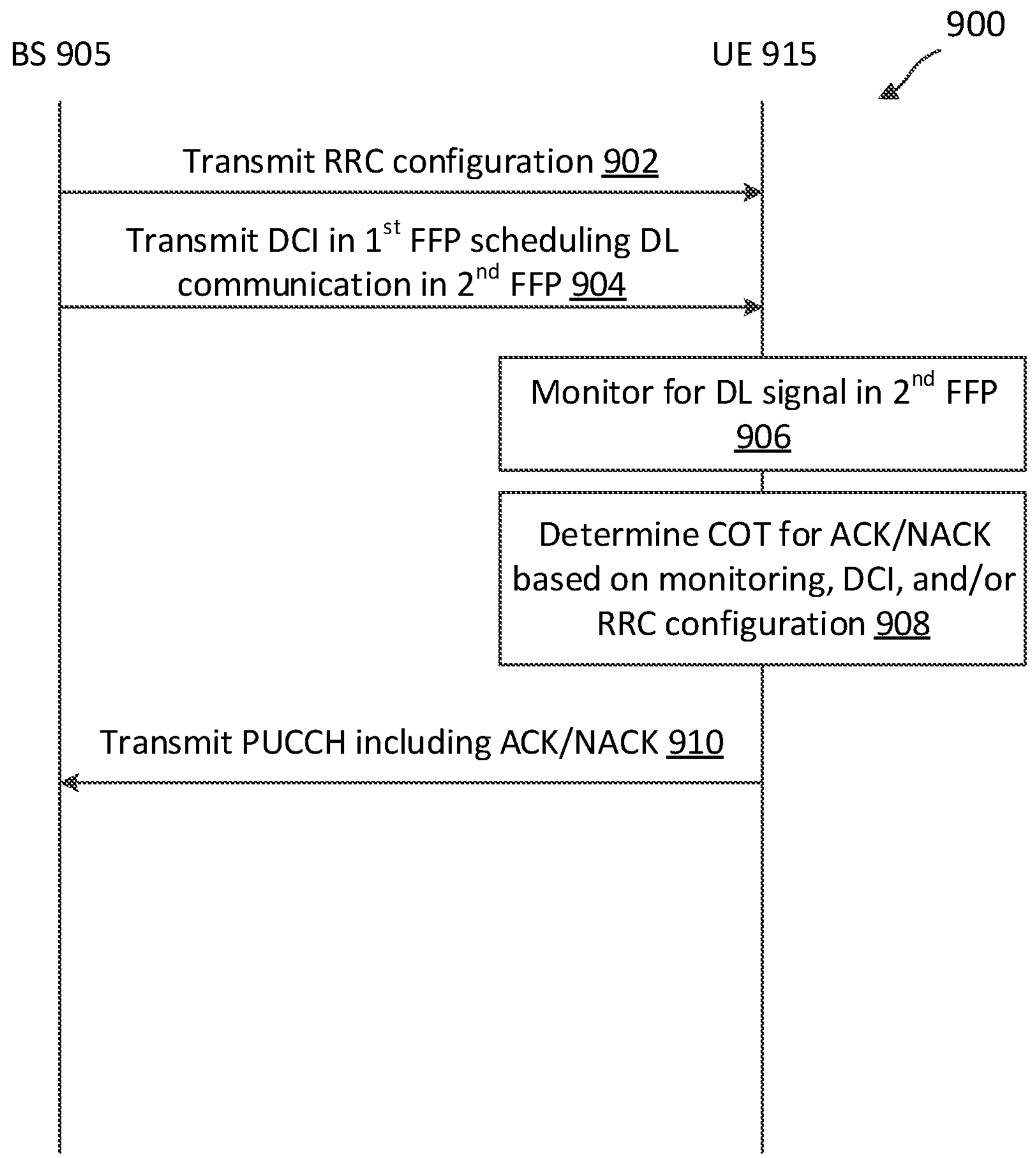
FIG. 9 illustrates a signaling diagram of a cross-FFP communication method according to some aspects of the present disclosure.

FIG. 9 illustrates a signaling diagram of a cross-FFP HARQ communication method 900 according to some aspects of the present disclosure. The method 900 is performed by a BS 905 and a UE 915. The BS 905 may be one of the BSs 105 of the network 100, and the UE 915 may be one of the UEs 115 of the network 100. The method 900 may include aspects of the schemes 300-800 described above. The method 900 may involve the BS 905 and the UE 915 communicating in a shared frequency band (e.g., NR-U) while in FBE mode. The method 900 may allow a UE to determine whether to transmit HARQ feedback in a BS COT or a UE COT based on one or more of a RRC configuration, an indication in a DCI, or a RRC configuration.

At 902, the BS 905 transmits, and the UE receives, a RRC configuration. In some aspect, the BS may transmit a RRC message that includes the RRC configuration. In some aspects, the RRC message may include a system information block (SIB) message, a RRC Reconfiguration message, or any suitable RRC message. The RRC configuration may include one or more fields indicating whether the UE is configured to initiate a UE COT in FBE mode. In another aspect, the RRC configuration may include one or more fields indicating whether the UE is configured to initiate a UE COT when the UE is indicated to share a BS COT, as illustrated in the scheme 700 shown in FIG. 7. In another aspect, the RRC configuration may include one or more fields indicating whether the UE is configured to share a BS COT when the UE is indicated to initiate a UE COT, as illustrated in the scheme 800 shown in FIG. 8.

At 904, the BS 905 transmits, and the UE 915 receives, DCI in a first FFP. The DCI may schedule a DL communication (e.g., PDSCH) in a second FFP subsequent to the first FFP. For example, in some aspects, the UE 915 may receive the DCI in a PDCCH transmitted by the BS in a first COT associated with the first FFP. The DCI may indicate a PDSCH scheduled in a second FFP. In some aspects, receiving the DCI includes performing a blind decoding operation in a plurality of search spaces in a CORESET configured in the UE. The UE may receive the DCI masked with a system information radio network temporary identifier (SI-RNTI) (e.g., for an idle mode UE) or masked with a cell radio network temporary identifier (C-RNTI) (e.g., for a connected mode UE). In some instances, the UE receives the DCI in DCI format 1_0, 1_1, or 1_2 masked with C-RNTI. In some aspects, the DCI may also indicate the UE 915 to either share a BS COT in the second FFP, or to initiate a UE COT in the second FFP.

At 906, the UE monitors for a DL signal in the second FFP. The DL signal may indicate to the UE 915 that the BS 905 has successfully acquired a COT in the second FFP. In some instances, the UE 915 monitors for the DL signal based on one or more predefined resource candidates. The predefined resource candidates may be defined based on a CORESET, search space (common, group-specific, and/or UE-specific), time resources, frequency resources, aggregation level, and/or combinations thereof. The predefined resource candidates may be set by a network specification, programmed in the UE's memory, and/or combinations thereof. The predefined resource candidates may be determined by the BS 905 and communicated to one or more UEs through a RRC-configuration, a SIB, a MIB, and/or other signaling. In some instances, the UE 915 monitors for the DL signal in a common search space (CSS) of a physical downlink control channel (PDCCH). In some instances, the common search space is a Type 0 CSS. In some instances, the UE 915 monitors for the DL signal in a user-equipment specific search space (USS) of a PDCCH. In another aspect, monitoring for the DL signal may include monitoring for a DL reference signal (e.g., DMRS). However, it will be understood that these DL signals and channels are merely exemplary, and that action 906 may include or involve monitoring for any other suitable signal.

At 908, the UE 915 determines a COT for communicating HARQ feedback (e.g., ACK/NACK) based on at least one of the indication in the DCI transmitted at action 904, the monitoring for the DL signal of action 906, or the RRC configuration transmitted at action 902. For example, the UE 915 may determine to transmit the ACK/NACK in either a BS COT associated with the second FFP or a UE COT associated with the second FFP based on at least one of the schemes 700, 800 illustrated in FIGS. 7 and 8.

At 910, the UE 915 transmits, and the BS 905 receives, a PUCCH including the ACK/NACK based on the determining of action 908. In this regard, the UE 915 may transmit the PUCCH based on either a UE COT or a BS COT based on the determining of action 908. In other aspects, the UE 915 may refrain from transmitting the PUCCH based on the determining of action 908.

Figure 10:
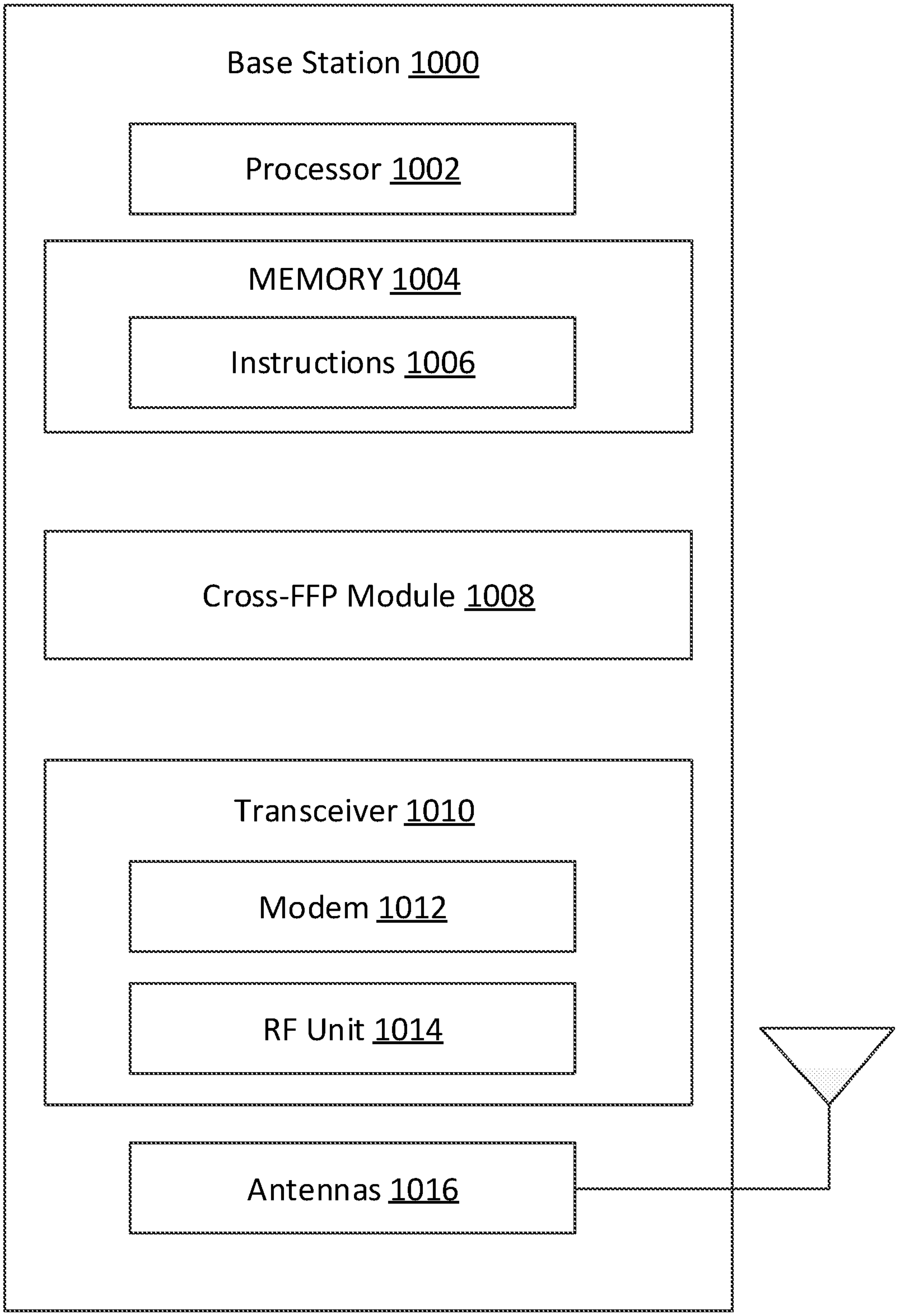
FIG. 10 is a block diagram of a user equipment (UE) according to some aspects of the present disclosure.

FIG. 10 is a block diagram of an exemplary BS 1000 according to some aspects of the present disclosure. The BS 1000 may be a BS 105 in the network 100 as discussed above in FIGS. 1 and 3A. A shown, the BS 1000 may include a processor 1002, a memory 1004, a cross-FFP module 1008, a transceiver 1010 including a modem subsystem 1012 and a RF unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-7 and 11. Instructions 1006 may also be referred to as code, which may be interpreted broadly to include any type of computer-readable statement(s) as discussed above.

The cross-FFP module 1008 may be implemented via hardware, software, or combinations thereof. For example, the cross-FFP module 1008 may be implemented as a processor, circuit, and/or instructions 1006 stored in the memory 1004 and executed by the processor 1002. In some instances, the cross-FFP module 1008 can be integrated within the modem subsystem 1012. For example, the cross-FFP module 1008 can be implemented by a combination of software components (e.g., executed by a DSP or a general processor) and hardware components (e.g., logic gates and circuitry) within the modem subsystem 1012.

The cross-FFP module 1008 may be used for various aspects of the present disclosure, for example, aspects of aspects of FIGS. 3-9 and 13. The cross-FFP module 1008 can be configured to transmit, to a user equipment (UE) in a first fixed frame period (FFP), a DCI indicating a scheduled DL communication in a second FFP subsequent to the first FFP. For example, the cross-FFP module 1008 may be configured to transmit the DCI in a PDCCH and in a first COT associated with the first FFP. The DCI may indicate a PDSCH scheduled in a second FFP. The cross-FFP module 1008 may be configured to transmit the DCI masked with a system information radio network temporary identifier (SI-RNTI) (e.g., for an idle mode UE) or masked with a cell radio network temporary identifier (C-RNTI) (e.g., for a connected mode UE). In some instances, the cross-FFP module 1008 is configured to transmit the DCI in DCI format 1_0, 1_1, or 1_2 masked with C-RNTI.

In some aspects, the DCI indicates, to the UE, whether the UE can share a BS COT in the second FFP, or whether the UE can initiate a UE COT in the second FFP. For example, the DCI may include a field having one, two, three, or more bits indicating a selection of one or more cross-FFP configuration options. For example, the field of the DCI may include a first value indicating the UE to share a BS COT in the second FFP, or may include a second value indicating the UE to initiate a UE COT in the second FFP.

In some aspects, the cross-FFP module 1008 may be configured to perform a channel assessment for a BS channel occupancy time (COT) in the second FFP. In some aspects, performing the channel assessment includes performing a clear channel assessment (CCA), or a listen-before-talk (LBT) procedure. In one example, the cross-FFP module 1008 is configured to perform a RRC CAT 2 to determine whether a shared frequency band is available. As explained above, performing the LBT may include performing channel sensing for a configured amount of time, and comparing channel measurements to a threshold. If the LBT results in a pass, the cross-FFP module 1008 may be configured to acquire or initiate a COT in the second FFP. In some aspects, the cross-FFP module 1008 may be configured to determine, based on the channel assessment, not to initiate the BS COT. In this regard, the cross-FFP module 1008 may be configured to determine that the shared frequency band is not available based on the LBT resulting in a fail.

In another aspect, the cross-FFP module 1008 may be configured to receive, in a UE COT, a non-acknowledgement (NACK). The UE COT may be associated with the second FFP. For example, the UE COT may at least partially overlap in the time domain with the second FFP. In some aspects, receiving the NACK includes receiving a PUCCH (e.g., PUCCH format 0) carrying the NACK. In some aspects, the BS may receive the NACK based on an indication in the DCI. For example, if the DCI indicates the UE to share a BS COT in the second FFP, the cross-FFP module 1008 may be configured to monitor for the NACK in the UE COT. Thus, the cross-FFP module 1008 may be configured to receive the NACK in a UE COT even though the DCI indicated the UE to share a BS COT in the second FFP. In some aspects, the receiving the NACK in the UE COT is based on a cross-FFP configuration. The cross-FFP module 1008 may be configured to configure the UE with the cross-FFP configuration using RRC signaling, for example.

As shown, the transceiver 1010 may include the modem subsystem 1012 and the RF unit 1014. The transceiver 1010 can be configured to communicate bi-directionally with other devices, such as the UEs 115 and/or 800, another BS 105, and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., SSBs, RMSI, MIB, SIB, FBE configuration, RRC configurations, PRACH configuration, PDCCH, PDSCH) from the modem subsystem 1012 (on outbound transmissions) or of transmissions originating from another source, such as a UE 115. RF unit 1014 can include circuitry such as analog to digital converters, digital to analog converters, filters, amplifiers, etc. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 105 to enable the BS 105 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The transceiver 1010 may provide the demodulated and decoded data (e.g., PUCCH control information, PRACH signals, PUSCH data, HARQ ACK/NACK) to the cross-FFP module 1008 for processing. The antennas 1016 may include multiple antennas of similar or different designs in order to sustain multiple transmission links.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

Figure 11:
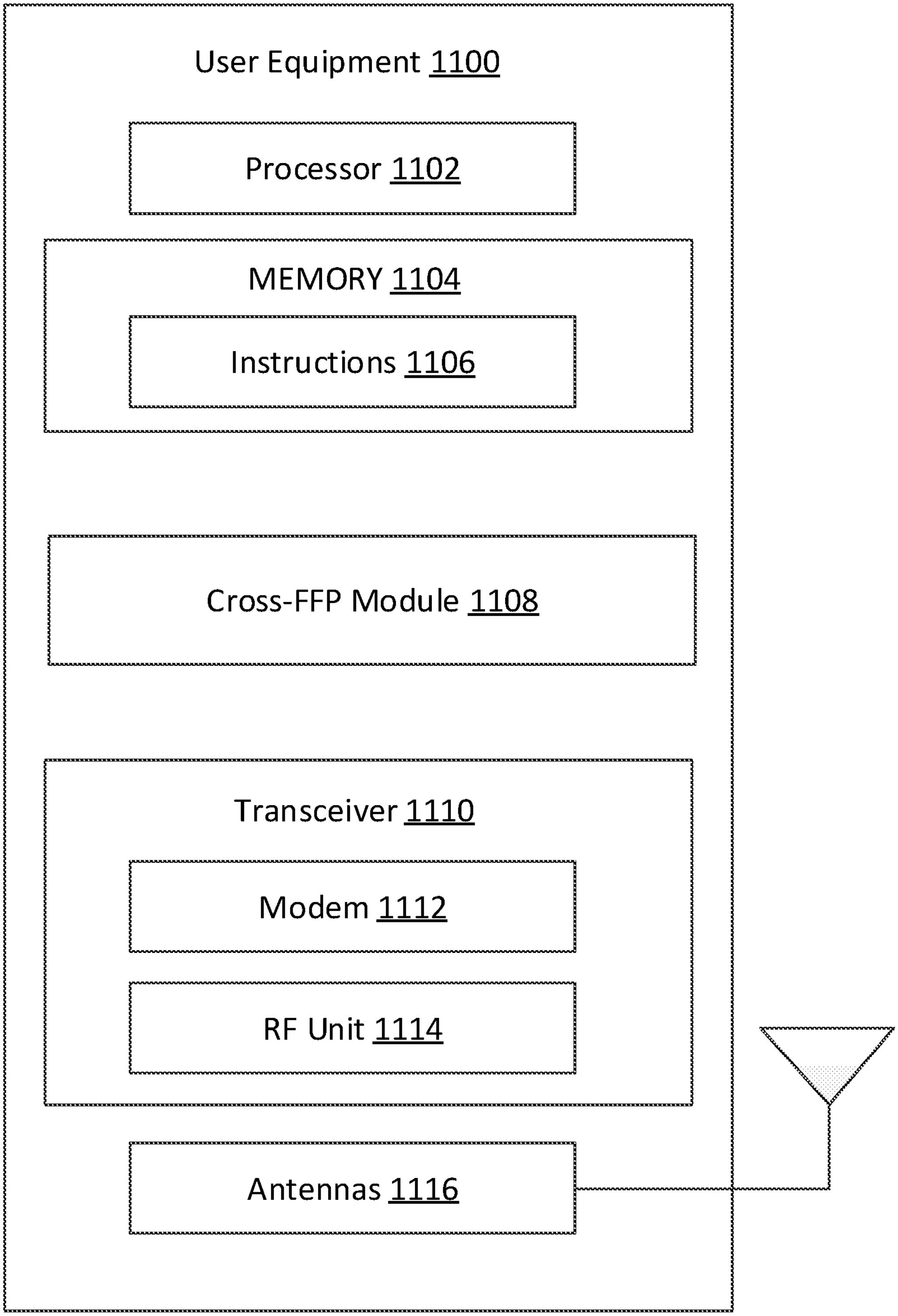
FIG. 11 is a block diagram of an exemplary base station (BS) according to some aspects of the present disclosure.

FIG. 11 is a block diagram of an exemplary UE 1100 according to some aspects of the present disclosure. The UE 1100 may be a UE 115 discussed above in FIG. 1. As shown, the UE 1100 may include a processor 1102, a memory 1104, a cross-FFP module 1108, a transceiver 1110 including a modem subsystem 1112 and a radio frequency (RF) unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1104 includes a non-transitory computer-readable medium. The memory 1104 may store, or have recorded thereon, instructions 1106. The instructions 1106 may include instructions that, when executed by the processor 1102, cause the processor 1102 to perform the operations described herein with reference to the UEs 115 in connection with aspects of the present disclosure, for example, aspects of FIGS. 2-7 and 11. Instructions 1106 may also be referred to as program code. The program code may be for causing a wireless communication device to perform these operations, for example by causing one or more processors (such as processor 1102) to control or command the wireless communication device to do so. The terms “instructions” and “code” should be interpreted broadly to include any type of computer-readable statement(s). For example, the terms “instructions” and “code” may refer to one or more programs, routines, subroutines, functions, procedures, etc. “Instructions” and “code” may include a single computer-readable statement or many computer-readable statements.

The cross-FFP module 1108 may be implemented via hardware, software, or combinations thereof. For example, the cross-FFP module 1108 may be implemented as a processor, circuit, and/or instructions 1106 stored in the memory 1104 and executed by the processor 1102. In some instances, the cross-FFP module 1108 can be integrated within the modem subsystem 1112. For example, the cross-FFP module 1108 can be implemented by a combination of software components (e.g., executed by a DSP or a general processor) and hardware components (e.g., logic gates and circuitry) within the modem subsystem 1112.

The cross-FFP module 1108 may be used for various aspects of the present disclosure, for example, aspects of aspects of FIGS. 3-9 and 12. The cross-FFP module 1108 may be configured to receive, from a BS in a first FFP, DCI indicating a scheduled DL communication in a second FFP subsequent to the first FFP. For example, in some aspects, the cross-FFP module 1108 may be configured to receive the DCI in a PDCCH transmitted by the BS in a first COT associated with the first FFP. The DCI may indicate a PDSCH scheduled in a second FFP. In some aspects, receiving the DCI includes performing a blind decoding operation in a plurality of search spaces in a CORESET configured in the UE. The cross-FFP module 1108 may be configured to receive the DCI masked with a system information radio network temporary identifier (SI-RNTI) (e.g., for an idle mode UE) or masked with a cell radio network temporary identifier (C-RNTI) (e.g., for a connected mode UE). In some instances, the UE receives the DCI in DCI format 1_0, 1_1, or 1_2 masked with C-RNTI.

In some aspects, the cross-FFP module 1108 may be configured to monitor for a DL signal in the second FFP. The DL signal may indicate to the UE that the BS has successfully acquired a COT in the second FFP. In some instances, the cross-FFP module 1108 may be configured to monitors for the DL signal based on one or more predefined resource candidates. The predefined resource candidates may be defined based on a CORESET, search space (common, group-specific, and/or UE-specific), time resources, frequency resources, aggregation level, and/or combinations thereof. The predefined resource candidates may be set by a network specification, programmed in the UE's memory, and/or combinations thereof. The predefined resource candidates may be determined by a BS and communicated to one or more UEs through a RRC-configuration, a SIB, a MIB, and/or other signaling. In some instances, the cross-FFP module 1108 may be configured to monitor for the DL signal in a common search space (CSS) of a physical downlink control channel (PDCCH). In some instances, the common search space is a Type 0 CSS. In some instances, the cross-FFP module 1108 may be configured to monitor for the DL signal in a user-equipment specific search space (USS) of a PDCCH. In another aspect, monitoring for the DL signal may include monitoring for a DL reference signal (e.g., DMRS). However, it will be understood that these DL signals and channels are merely exemplary, and that the cross-FFP module 1108 may be configured to monitor for any other suitable signal.

In some aspects, the cross-FFP module 1108 may be configured to transmit, based on the monitoring for the DL signal, an acknowledgement/non-acknowledgement (ACK/NACK) indicating whether the cross-FFP module 1108 detected the scheduled DL communication. In some aspects, transmitting the ACK/NACK includes transmitting a NACK in a physical uplink control channel (PUCCH) (e.g., PUCCH format 0). The cross-FFP module 1108 may be configured to transmit the ACK/NACK in either a BS COT or a UE COT, based on the detecting or failing to detect the DL signal. For example, the cross-FFP module 1108 may be configured to transmit, in response to detecting the DL signal and failing to detect the scheduled DL communication, a NACK in a BS COT. In another aspect, the cross-FFP module 1108 may be configured to transmit, in response to failing to detect the DL signal, a NACK in a UE COT. In this regard, the cross-FFP module 1108 may be configured to be configured to acquire a UE COT that at least partially overlaps with the second FFP in response to failing to detect the DL signal in the second FFP. In another aspect, the cross-FFP module 1108 may be configured to refrain, in response to failing to detect the DL signal, from transmitting the NACK in either the BS COT or the UE COT.

In some aspects, the cross-FFP module 1108 may be configured to transmit the ACK/NACK further based on a content of the scheduling DCI. For example, the cross-FFP module 1108 may be configured to transmit the ACK/NACK based on an indication in the DCI that either indicates the UE 1100 to share a portion of a BS COT in the second FFP, or to initiate a UE COT in a portion of the second FFP. For example, in some aspects, the DCI may indicate the UE 1100 to share a BS COT in the second FFP, and the cross-FFP module 1108 may be configured to transmit a NACK in the BS COT based on detecting the DL signal in the second FFP. In another aspect, if the DCI indicates the UE to share the BS COT in the second FFP, the cross-FFP module 1108 may be configured to initiate a UE COT and transmitting the NACK based on failing to detect the DL signal in the second FFP. In another example, the DCI may indicate the UE 1100 to initiate a UE COT in the second FFP, and the cross-FFP module 1108 may be configured to transmit, in response to failing to detect the DL signal in the second FFP, a NACK in a UE COT associated with the second FFP. In another aspect, if the DCI indicates the UE 1100 to initiate the UE COT in the second FFP, the cross-FFP module 1108 may be configured to transmit the NACK in a BS COT based on detecting the DL signal in the FFP.

In another aspect, the cross-FFP module 1108 may be configured to transmit the ACK/NACK further based on RRC signaling. For example, the cross-FFP module 1108 may be configured to receive a RRC message or RRC configuration indicating whether the UE 1100 can initiate a UE COT when the UE 1100 is indicated to share a BS COT in the second FFP. In another aspect, the RRC message or RRC configuration may indicate whether the UE 1100 can share a BS COT when the UE 1100 is indicated to initiate a UE COT.

As shown, the transceiver 1110 may include the modem subsystem 1112 and the RF unit 1114. The transceiver 1110 can be configured to communicate bi-directionally with other devices, such as the BSs 105. The modem subsystem 1112 may be configured to modulate and/or encode the data from the memory 1104 and/or the cross-FFP module 1108 according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., PUCCH control information, PRACH signals, PUSCH data, HARQ ACK/NACK) from the modem subsystem 1112 (on outbound transmissions) or of transmissions originating from another source such as another UE 115 or a BS 115. RF unit 1114 can include circuitry such as analog to digital converters, digital to analog converters, filters, amplifiers, etc. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 115 to enable the UE 115 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices. The antennas 1116 may provide the received data messages for processing and/or demodulation at the transceiver 1110. The transceiver 1110 may provide the demodulated and decoded data (e.g., DCI, SSBs, RMSI, MIB, SIB, FBE configuration, PRACH configuration, RRC configurations, PDCCH, PDSCH) to the cross-FFP module 1108 for processing. The antennas 1116 may include multiple antennas of similar or different designs in order to sustain multiple transmission links. The RF unit 1114 may configure the antennas 1116.

In an aspect, the UE 1100 can include multiple transceivers 1110 implementing different RATs (e.g., NR and LTE). In an aspect, the UE 1100 can include a single transceiver 1110 implementing multiple RATs (e.g., NR and LTE). In an aspect, the transceiver 1110 can include various components, where different combinations of components can implement different RATs.

Figure 12:
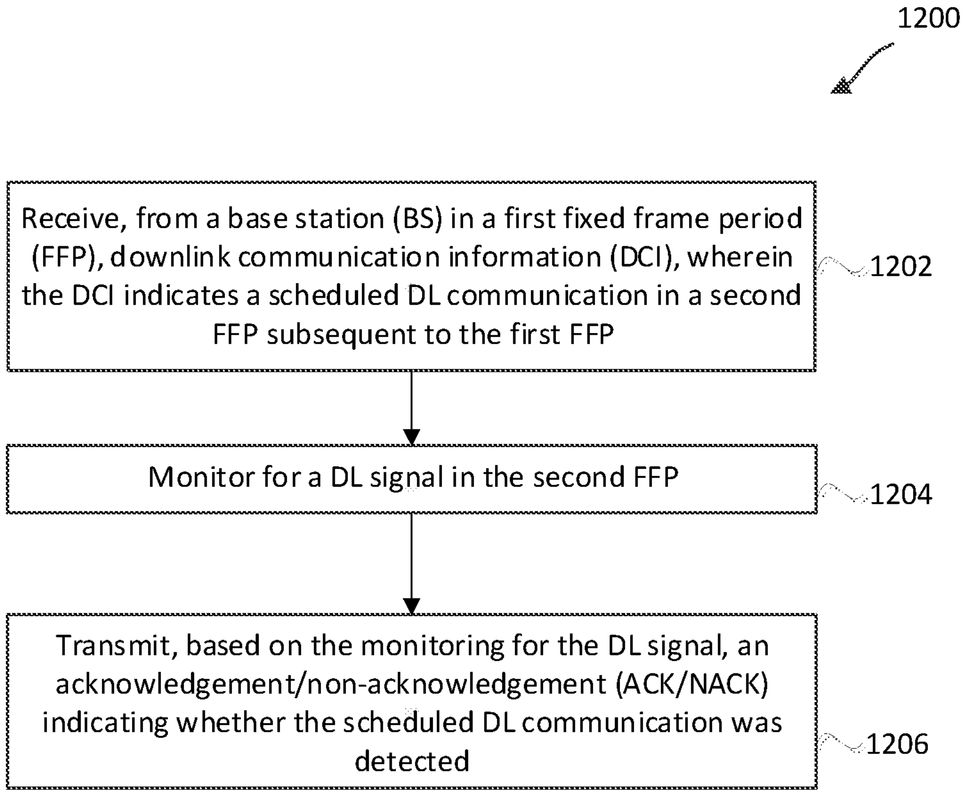
FIG. 12 is a flow diagram of a communication method according to some aspects of the present disclosure.

FIG. 12 is a flow diagram of a communication method 1200 according to some aspects of the present disclosure. Steps of the method 1200 can be executed by a computing device (e.g., a processor, processing circuit, and/or other suitable component) of an apparatus or other suitable means for performing the steps. For example, a UE, such as UEs 115 and/or 1100, may utilize one or more components, such as the processor 1102, the memory 1104, the cross-FFP module 1108, the transceiver 1110, and the one or more antennas 1116, to execute the steps of method 1200. The method 1200 may employ similar mechanisms as described above with respect to FIGS. 3-9. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1202, the UE receives, from a base station (BS) in a first fixed frame period (FFP), downlink communication information (DCI), where the DCI indicates a scheduled DL communication in a second FFP subsequent to the first FFP. For example, in some aspects, the UE may receive the DCI in a PDCCH transmitted by the BS in a first COT associated with the first FFP. The DCI may indicate a PDSCH scheduled in a second FFP. In some aspects, receiving the DCI includes performing a blind decoding operation in a plurality of search spaces in a CORESET configured in the UE. The UE may receive the DCI masked with a system information radio network temporary identifier (SI-RNTI) (e.g., for an idle mode UE) or masked with a cell radio network temporary identifier (C-RNTI) (e.g., for a connected mode UE). In some instances, the UE receives the DCI in DCI format 1_0, 1_1, or 1_2 masked with C-RNTI. The UE 1100 may utilize one or more components, such as the processor 1102, the memory 1104, the cross-FFP module 1108, the transceiver 1110, and the one or more antennas 1116, to execute the actions of block 1202.

At block 1204, the UE monitors for a DL signal in the second FFP. The DL signal may indicate to the UE that the BS has successfully acquired a COT in the second FFP. In some instances, the UE monitors for the DL signal based on one or more predefined resource candidates. The predefined resource candidates may be defined based on a CORESET, search space (common, group-specific, and/or UE-specific), time resources, frequency resources, aggregation level, and/or combinations thereof. The predefined resource candidates may be set by a network specification, programmed in the UE's memory, and/or combinations thereof. The predefined resource candidates may be determined by a BS and communicated to one or more UEs through a RRC-configuration, a SIB, a MIB, and/or other signaling. In some instances, the UE monitors for the DL signal in a common search space (CSS) of a physical downlink control channel (PDCCH). In some instances, the common search space is a Type 0 CSS. In some instances, the UE monitors for the DL signal in a user-equipment specific search space (USS) of a PDCCH. In another aspect, monitoring for the DL signal may include monitoring for a DL reference signal (e.g., DMRS). However, it will be understood that these DL signals and channels are merely exemplary, and that block 1204 may include or involve monitoring for any other suitable signal. The UE 1100 may utilize one or more components, such as the processor 1102, the memory 1104, the cross-FFP module 1108, the transceiver 1110, and the one or more antennas 1116, to execute the actions of block 1204.

At block 1206, the UE transmits, based on the monitoring for the DL signal, an acknowledgement/non-acknowledgement (ACK/NACK) indicating whether the UE detected the scheduled DL communication. In some aspects, transmitting the ACK/NACK includes transmitting a NACK in a physical uplink control channel (PUCCH) (e.g., PUCCH format 0). The UE may transmit the ACK/NACK in either a BS COT or a UE COT, based on the detecting or failing to detect the DL signal. For example, the UE may transmit, in response to detecting the DL signal and failing to detect the scheduled DL communication, a NACK in a BS COT. In another aspect, the UE may transmit, in response to failing to detect the DL signal, a NACK in a UE COT. In this regard, the UE may be configured to acquire a UE COT that at least partially overlaps with the second FFP in response to failing to detect the DL signal in the second FFP. In another aspect, the UE refrains, in response to failing to detect the DL signal, from transmitting the NACK in either the BS COT or the UE COT.

In some aspects, the UE may transmit the ACK/NACK further based on a content of the scheduling DCI received at block 1202. For example, the UE may transmit the ACK/NACK based on an indication in the DCI that either indicates the UE to share a portion of a BS COT in the second FFP, or to initiate a UE COT in a portion of the second FFP. For example, in some aspects, the DCI may indicate the UE to share a BS COT in the second FFP, and block 1206 may include transmitting a NACK in the BS COT based on detecting the DL signal in the second FFP. In another aspect, if the DCI indicates the UE to share the BS COT in the second FFP, block 1206 may include initiating a UE COT and transmitting the NACK based on failing to detect the DL signal in the second FFP. In another example, the DCI received at block 1202 may indicate the UE to initiate a UE COT in the second FFP, and block 1206 may include transmitting, in response to failing to detect the DL signal in the second FFP, a NACK in a UE COT associated with the second FFP. In another aspect, if the DCI received at block 1202 indicates the UE to initiate the UE COT in the second FFP, block 1206 may include transmitting the NACK in a BS COT based on detecting the DL signal in the FFP.

In another aspect, the UE may transmit the ACK/NACK further based on RRC signaling. For example, the method 1200 may include receiving a RRC message or RRC configuration indicating whether the UE can initiate a UE COT when the UE is indicated to share a BS COT in the second FFP. In another aspect, the RRC message or RRC configuration may indicate whether the UE can share a BS COT when the UE is indicated to initiate a UE COT. These configurations, which enable the UE to transmit the NACK in a different COT than what is indicated in DCI, may allow the UE and the BS greater flexibility in communicating the ACK/NACK in the second FFP, since it is not known whether the BS or the UE will acquire a COT in the second FFP. The UE 1100 may utilize one or more components, such as the processor 1102, the memory 1104, the cross-FFP module 1108, the transceiver 1110, and the one or more antennas 1116, to execute the actions of block 1206.

Figure 13:
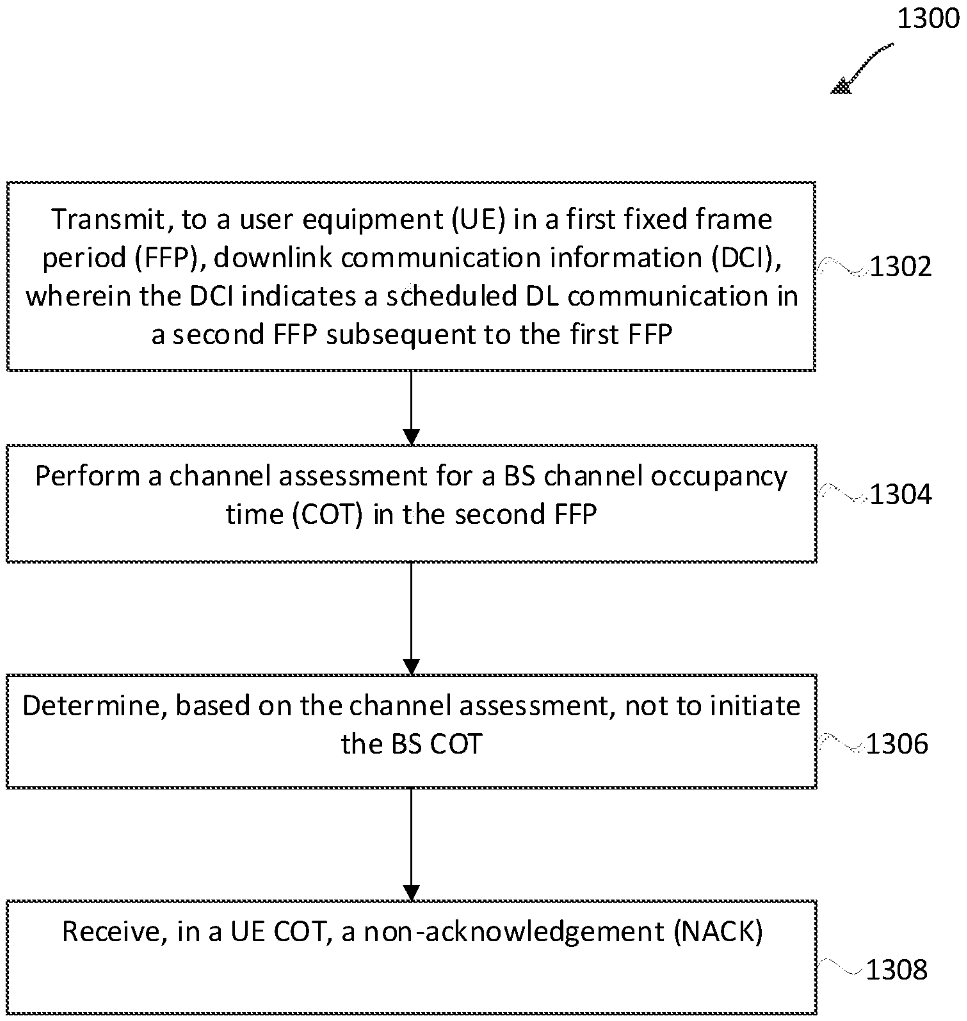
FIG. 13 is a flow diagram of a communication method according to some aspects of the present disclosure.

FIG. 13 is a flow diagram of a communication method 1300 according to some aspects of the present disclosure. Steps of the method 1300 can be executed by a computing device (e.g., a processor, processing circuit, and/or other suitable component) of an apparatus or other suitable means for performing the steps. For example, a BS, such as the BSs 105 and/or 1000, may utilize one or more components, such as the processor 1002, the memory 1004, the cross-FFP module 1008, the transceiver 1010, and the one or more antennas 1016, to execute the steps of method 1300. The method 1300 may employ similar mechanisms as described above with respect to FIGS. 3-9. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1302, the BS transmits to a user equipment (UE) in a first fixed frame period (FFP), downlink communication information (DCI), where the DCI indicates a scheduled DL communication in a second FFP subsequent to the first FFP. For example, in some aspects, the BS may transmit the DCI in a PDCCH and in a first COT associated with the first FFP. The DCI may indicate a PDSCH scheduled in a second FFP. The BS may transmit the DCI masked with a system information radio network temporary identifier (SI-RNTI) (e.g., for an idle mode UE) or masked with a cell radio network temporary identifier (C-RNTI) (e.g., for a connected mode UE). In some instances, the BS transmits the DCI in DCI format 1_0, 1_1, or 1_2 masked with C-RNTI. In some aspects, the DCI indicates, to the UE, whether the UE can share a BS COT in the second FFP, or whether the UE can initiate a UE COT in the second FFP. For example, the DCI may include a field having one, two, three, or more bits indicating a selection of one or more cross-FFP configuration options. For example, the field of the DCI may include a first value indicating the UE to share a BS COT in the second FFP, or may include a second value indicating the UE to initiate a UE COT in the second FFP. The BS 1000 may utilize one or more components, such as the processor 1002, the memory 1004, the cross-FFP module 1008, the transceiver 1010, and the one or more antennas 1016, to execute the actions of block 1302.

At block 1304, the BS performs a channel assessment for a BS channel occupancy time (COT) in the second FFP. In some aspects, performing the channel assessment includes performing a clear channel assessment (CCA), or a listen-before-talk (LBT) procedure. In one example, block 1304 includes performing a RRC CAT 2 to determine whether a shared frequency band is available to acquire a COT. As explained above, performing the LBT may include performing channel sensing for a configured amount of time, and comparing channel measurements to a threshold.

At block 1306, the BS determines, based on the channel assessment performed at block 1304, not to initiate the BS COT. In this regard, block 1306 may include the BS determining that the shared frequency band is not available based on an LBT performed at block 1304. Accordingly, based on the failing the LBT, the BS may refrain from transmitting a DL signal and/or a DL communication (e.g., PDSCH) in the second FFP.

At block 1308, the BS receives, in a UE COT, a non-acknowledgement (NACK). The UE COT may be associated with the second FFP. For example, the UE COT may at least partially overlap in the time domain with the second FFP. In some aspects, receiving the NACK includes receiving a PUCCH (e.g., PUCCH format 0) carrying the NACK. In some aspects, the BS may receive the NACK based on an indication in the DCI transmitted at block 1302. For example, if the DCI indicates the UE to share a BS COT in the second FFP, the BS may be configured to monitor for the NACK in the UE COT. Thus, the BS may receive the NACK in a UE COT even though the DCI indicated the UE to share a BS COT in the second FFP. In some aspects, the receiving the NACK in the UE COT is based on a cross-FFP configuration. The BS may configure the UE with the cross-FFP configuration using RRC signaling, for example. In one example, the cross-FFP configuration may enable the UE to share a BS COT when the UE is indicated to initiate a UE COT. In another example, the cross-FFP configuration may enable the UE to initiate a UE COT when the UE is indicated to share a BS COT. These configurations, which enable the UE to transmit the NACK in a different COT than what is indicated in DCI, may allow the UE and the BS greater flexibility in communicating the ACK/NACK in the second FFP, since it is not known whether the BS or the UE will acquire a COT in the second FFP.

The present disclosure also includes the following aspects:

1. A method of wireless communication performed by a user equipment (UE), the method comprising:

- receiving, from a base station (BS) in a first fixed frame period (FFP), downlink communication information (DCI), wherein the DCI indicates a scheduled DL communication in a second FFP subsequent to the first FFP;
- monitoring for a downlink (DL) signal in the second FFP; and
- transmitting, based on the monitoring for the DL signal, an acknowledgement/non-acknowledgement (ACK/NACK) indicating whether the scheduled DL communication was detected.

2. The method of clause 1, wherein the transmitting the ACK/NACK comprises:

transmitting, in response to detecting the DL signal in the second FFP, the ACK/NACK in the second FFP, wherein the second FFP is associated with a BS channel occupancy time (COT).

3. The method of clause 1, wherein the transmitting the ACK/NACK comprises:

transmitting, in response to failing to detect the DL signal in the second FFP, the ACK/NACK in a third FFP different from the second FFP, wherein the third FFP is associated with a UE COT.

4. The method of any of clauses 1-3, wherein:

the DCI comprises a first parameter indicating at least one of:

the UE to share a BS COT in the second FFP; or the UE to initiate a UE COT in the second FFP, and the transmitting the ACK/NACK is further based on the first parameter.

5. The method of clause 4, wherein:

the first parameter indicates the UE to share the BS COT, and the transmitting the ACK/NACK comprises:

transmitting, in response to detecting the DL signal in the second FFP, the ACK/NACK in the BS COT.

6. The method of clause 4, wherein:

the first parameter indicates the UE to share the BS COT, and the transmitting the ACK/NACK comprises:

transmitting, in response to failing to detect the DL signal in the second FFP, the ACK/NACK in the UE COT.

7. The method of clause 4, wherein:

the first parameter indicates that the scheduled DL communication is associated with the UE COT, and the transmitting the ACK/NACK comprises:

transmitting the ACK/NACK in the UE COT.

8. The method of clause 4, wherein:

the first parameter indicates that the scheduled DL communication is associated with the UE COT, and the transmitting the ACK/NACK comprises:

transmitting, in response to detecting the DL signal in the second FFP, the ACK/NACK in the BS COT.

9. The method of clause 4, wherein:

the first parameter indicates that the scheduled DL communication is associated with the UE COT, and the transmitting the ACK/NACK comprises:

transmitting, in response to failing to detect the DL signal in the second FFP, the ACK/NACK in the UE COT.

10. The method of any of clauses 4-9, further comprising:

receiving, from the BS, a radio resource control (RRC) communication indicating a second parameter, wherein the second parameter indicates whether the UE is enabled to initiate the UE COT when the first parameter indicates the UE to share the BS COT in the second FFP, wherein the transmitting the ACK/NACK is further based on the second parameter.

11. The method of any of clauses 4-9, further comprising:

receiving, from the BS, a RRC communication indicating a third parameter, wherein the third parameter indicates whether the UE is enabled to share the BS COT when the first parameter indicates the UE to initiate the UE COT in the second FFP, wherein the transmitting the ACK/NACK is further based on the third parameter.

12. A method of wireless communication performed by a base station (BS), the method comprising:

transmitting, to a user equipment (UE) in a first fixed frame period (FFP), downlink communication information (DCI), wherein the DCI indicates a scheduled DL communication in a second FFP subsequent to the first FFP;

performing a channel assessment for a BS channel occupancy time (COT) in the second FFP;

determining, based on the channel assessment, not to initiate the BS COT; and receiving, in a UE COT, a non-acknowledgement (NACK) signal.

13. The method of clause 12, wherein:

the DCI indicates at least one of:

the UE to share a BS COT in the second FFP; or the UE to initiate a UE COT in the second FFP.

14. The method of clause 13, further comprising:

transmitting, to the UE, a radio resource control (RRC) communication indicating whether the UE is enabled to initiate the UE COT when the DCI indicates the UE to share the BS COT in the second FFP.

15. The method of clause 13, further comprising:

transmitting, to the UE, a RRC communication indicating whether the UE is enabled to share the BS COT when the DCI indicates the UE to initiate the UE COT in the second FFP.

16. A user equipment (UE), comprising:

a transceiver; and a processor in communication with the transceiver, wherein the processor is configured to:

cause the transceiver to receive, from a base station (BS) in a first fixed frame period (FFP), downlink communication information (DCI), wherein the DCI indicates a scheduled DL communication in a second FFP subsequent to the first FFP;

monitor for a downlink (DL) signal in the second FFP; and cause the transceiver to transmit, based on the monitoring for the DL signal, an acknowledgement/non-acknowledgement (ACK/NACK) indicating whether the scheduled DL communication was detected.

17. The UE of clause 16, wherein the processor configured to cause the transceiver to transmit the ACK/NACK comprises the processor configured to:

cause the transceiver to transmit the processor configured to cause the transceiver to transmit, in response to detecting the DL signal in the second FFP, the ACK/NACK in the second FFP, wherein the second FFP is associated with a BS channel occupancy time (COT).

18. The UE of clause 16, wherein the processor configured to cause the transceiver to transmit the ACK/NACK comprises the processor configured to cause the transceiver to:

transmit, in response to failing to detect the DL signal in the second FFP, the ACK/NACK in a third FFP different from the second FFP, wherein the third FFP is associated with a UE COT.

19. The UE of any of clauses 16-18, wherein:

the DCI comprises a first parameter indicating at least one of:

the UE to share a BS COT in the second FFP; or the UE to initiate a UE COT in the second FFP, and the processor is configured to cause the transceiver to transmit the ACK/NACK further based on the first parameter.

20. The UE of clause 19, wherein:

the first parameter indicates the UE to share the BS COT, and the processor configured to cause the transceiver to transmit the ACK/NACK comprises the processor configured to:

cause the transceiver to transmit, in response to detecting the DL signal in the second FFP, the ACK/NACK in the BS COT.

21. The UE of clause 19, wherein:

the first parameter indicates the UE to share the BS COT, and the processor configured to cause the transceiver to transmit the ACK/NACK comprises the processor configured to:

cause the transceiver to transmit, in response to failing to detect the DL signal in the second FFP, the ACK/NACK in the UE COT.

22. The UE of clause 19, wherein:

the first parameter indicates that the scheduled DL communication is associated with the UE COT, and the processor configured to cause the transceiver to transmit the ACK/NACK comprises the processor configured to:

cause the transceiver to transmit the ACK/NACK in the UE COT.

23. The UE of clause 19, wherein:

the first parameter indicates that the scheduled DL communication is associated with the UE COT, and the processor configured to cause the transceiver to transmit the ACK/NACK comprises the processor configured to:

cause the transceiver to transmit, in response to detecting the DL signal in the second FFP, the ACK/NACK in the BS COT.

24 The UE of clause 19, wherein:

the first parameter indicates that the scheduled DL communication is associated with the UE COT, and the processor configured to cause the transceiver to transmit the ACK/NACK comprises the processor configured to:

cause the transceiver to transmit, in response to failing to detect the DL signal in the second FFP, the ACK/NACK in the UE COT.

25. The UE of any of clauses 19-24, wherein the processor is further configured to:

cause the transceiver to receive, from the BS, a radio resource control (RRC) communication indicating a second parameter, wherein the second parameter indicates whether the UE is enabled to initiate the UE COT when the first parameter indicates the UE to share the BS COT in the second FFP, wherein the processor is configured to cause the transceiver to transmit the ACK/NACK further based on the second parameter.

26 The UE of any of clauses 19-24, wherein the processor is further configured to:

cause the transceiver to receive, from the BS, a RRC communication indicating a third parameter, wherein the third parameter indicates whether the UE is enabled to share the BS COT when the first parameter indicates the UE to initiate the UE COT in the second FFP, wherein the processor is configured to cause the transceiver to transmit the ACK/NACK further based on the third parameter.

27. A base station (BS), comprising:

a transceiver; and a processor in communication with the transceiver, wherein the processor is configured to:

cause the transceiver to transmit, to a user equipment (UE) in a first fixed frame period (FFP), downlink communication information (DCI), wherein the DCI indicates a scheduled DL communication in a second FFP subsequent to the first FFP;

perform a channel assessment for a BS channel occupancy time (COT) in the second FFP;

determine, based on the channel assessment, not to initiate the BS COT; and cause the transceiver to receive, in a UE COT, a non-acknowledgement (NACK) signal.

28. The BS of clause 27, wherein:

the DCI indicates at least one of:

the UE to share a BS COT in the second FFP; or the UE to initiate a UE COT in the second FFP.

29. The BS of clause 28, wherein the processor is further configured to:

cause the transceiver to transmit, to the UE, a radio resource control (RRC) communication indicating whether the UE is enabled to initiate the UE COT when the DCI indicates the UE to share the BS COT in the second FFP.

30. The BS of clause 28, further comprising:

cause the transceiver to transmit, to the UE, a RRC communication indicating whether the UE is enabled to share the BS COT when the DCI indicates the UE to initiate the UE COT in the second FFP 31. A non-transitory computer-readable medium having program code recorded thereon, wherein the program code comprises:

code for causing a user equipment (UE) to receive, from a base station (BS) in a first fixed frame period (FFP), downlink communication information (DCI), wherein the DCI indicates a scheduled DL communication in a second FFP subsequent to the first FFP;

code for causing the UE to monitor for a downlink (DL) signal in the second FFP; and code for causing the UE to transmit, based on the monitoring for the DL signal, an acknowledgement/non-acknowledgement (ACK/NACK) indicating whether the scheduled DL communication was detected.

32. The non-transitory computer-readable medium of clause 31, wherein the code for causing the UE to transmit the ACK/NACK comprises:

code for causing the UE to transmit the processor configured to cause the transceiver to transmit, in response to detecting the DL signal in the second FFP, the ACK/NACK in the second FFP, wherein the second FFP is associated with a BS channel occupancy time (COT).

33. The non-transitory computer-readable medium of clause 31, wherein the code for causing the UE to transmit the ACK/NACK comprises:

code for causing the UE to transmit, in response to failing to detect the DL signal in the second FFP, the ACK/NACK in a third FFP different from the second FFP, wherein the third FFP is associated with a UE COT.

34. The non-transitory computer-readable medium of any of clauses 31-33, wherein:

the DCI comprises a first parameter indicating at least one of:

the UE to share a BS COT in the second FFP; or the UE to initiate a UE COT in the second FFP, and the code for causing the UE to transmit the ACK/NACK is further based on the first parameter.

35. The non-transitory computer-readable medium of clause 34, wherein:

the first parameter indicates the UE to share the BS COT, and the code for causing the UE to transmit the ACK/NACK comprises:

code for causing the UE to transmit, in response to detecting the DL signal in the second FFP, the ACK/NACK in the BS COT.

36. The non-transitory computer-readable medium of clause 34, wherein:

the first parameter indicates the UE to share the BS COT, and the code for causing the UE to transmit the ACK/NACK comprises:

code for causing the UE to transmit, in response to failing to detect the DL signal in the second FFP, the ACK/NACK in the UE COT.

37. The non-transitory computer-readable medium of clause 34, wherein:

the first parameter indicates that the scheduled DL communication is associated with the UE COT, and the code for causing the UE to transmit the ACK/NACK comprises:

code for causing the UE to transmit the ACK/NACK in the UE COT.

38. The non-transitory computer-readable medium of clause 34, wherein:

the first parameter indicates that the scheduled DL communication is associated with the UE COT, and the code for causing the UE to transmit the ACK/NACK comprises:

code for causing the UE to transmit, in response to detecting the DL signal in the second FFP, the ACK/NACK in the BS COT.

39. The non-transitory computer-readable medium of clause 34, wherein:

the first parameter indicates that the scheduled DL communication is associated with the UE COT, and the code for causing the UE to transmit the ACK/NACK comprises:

code for causing the UE to transmit, in response to failing to detect the DL signal in the second FFP, the ACK/NACK in the UE COT.

40. The non-transitory computer-readable medium of any of clauses 34-39, wherein the program code further comprises:

code for causing the UE to receive, from the BS, a radio resource control (RRC) communication indicating a second parameter, wherein the second parameter indicates whether the UE is enabled to initiate the UE COT when the first parameter indicates the UE to share the BS COT in the second FFP, wherein the code for causing the UE to transmit the ACK/NACK is further based on the second parameter.

41. The non-transitory computer-readable medium of any of clauses 34-39, wherein the program code further comprises:

code for causing the UE to receive, from the BS, a RRC communication indicating a third parameter, wherein the third parameter indicates whether the UE is enabled to share the BS COT when the first parameter indicates the UE to initiate the UE COT in the second FFP, wherein the code for causing the UE to transmit the ACK/NACK further based on the third parameter.

42. A non-transitory computer-readable medium having program code recorded thereon, wherein the program code comprises:

code for causing a base station (BS) to transmit, to a user equipment (UE) in a first fixed frame period (FFP), downlink communication information (DCI), wherein the DCI indicates a scheduled DL communication in a second FFP subsequent to the first FFP;

code for causing the BS to perform a channel assessment for a BS channel occupancy time (COT) in the second FFP;

code for causing the BS to determine, based on the channel assessment, not to initiate the BS COT; and code for causing the BS to receive, in a UE COT, a non-acknowledgement (NACK) signal.

43. The non-transitory computer-readable medium of clause 42, wherein:

the DCI indicates at least one of:

the UE to share a BS COT in the second FFP; or the UE to initiate a UE COT in the second FFP.

44. The non-transitory computer-readable medium of clause 43, wherein the program code further comprises:

code for causing the BS to transmit, to the UE, a radio resource control (RRC) communication indicating whether the UE is enabled to initiate the UE COT when the DCI indicates the UE to share the BS COT in the second FFP.

45. The non-transitory computer-readable medium of clause 43, wherein the program code further comprises:

code for causing the BS to transmit, to the UE, a RRC communication indicating whether the UE is enabled to share the BS COT when the DCI indicates the UE to initiate the UE COT in the second FFP.

46. A user equipment (UE), comprising:

means for receiving, from a base station (BS) in a first fixed frame period (FFP), downlink communication information (DCI), wherein the DCI indicates a scheduled DL communication in a second FFP subsequent to the first FFP;

means for monitoring for a downlink (DL) signal in the second FFP; and means for transmitting, based on the monitoring for the DL signal, an acknowledgement/non-acknowledgement (ACK/NACK) indicating whether the scheduled DL communication was detected.

47. The UE of clause 46, wherein the means for transmitting the ACK/NACK comprises:

means for transmitting, in response to detecting the DL signal in the second FFP, the ACK/NACK in the second FFP, wherein the second FFP is associated with a BS channel occupancy time (COT).

48. The UE of clause 46, wherein the means for transmitting the ACK/NACK comprises:

means for transmitting, in response to failing to detect the DL signal in the second FFP, the ACK/NACK in a third FFP different from the second FFP, wherein the third FFP is associated with a UE COT.

49. The UE of any of clauses 46-48, wherein:

the DCI comprises a first parameter indicating at least one of:

the UE to share a BS COT in the second FFP; or the UE to initiate a UE COT in the second FFP, and the means for transmitting the ACK/NACK is further based on the first parameter.

50. The UE of clause 49, wherein:

the first parameter indicates the UE to share the BS COT, and the means for transmitting the ACK/NACK comprises:

means for transmitting, in response to detecting the DL signal in the second FFP, the ACK/NACK in the BS COT.

51. The UE of clause 49, wherein:

the first parameter indicates the UE to share the BS COT, and the means for transmitting the ACK/NACK comprises:

means for transmitting, in response to failing to detect the DL signal in the second FFP, the ACK/NACK in the UE COT.

52. The UE of clause 49, wherein:

the first parameter indicates that the scheduled DL communication is associated with the UE COT, and the means for transmitting the ACK/NACK comprises:

means for transmitting the ACK/NACK in the UE COT.

53. The UE of clause 49, wherein:

the first parameter indicates that the scheduled DL communication is associated with the UE COT, and the means for transmitting the ACK/NACK comprises:

means for transmitting, in response to detecting the DL signal in the second FFP, the ACK/NACK in the BS COT.

54. The UE of clause 49, wherein:

the first parameter indicates that the scheduled DL communication is associated with the UE COT, and the means for transmitting the ACK/NACK comprises:

means for transmitting, in response to failing to detect the DL signal in the second FFP, the ACK/NACK in the UE COT.

55. The UE of any of clauses 49-54, further comprising:

means for receiving, from the BS, a radio resource control (RRC) communication indicating a second parameter, wherein the second parameter indicates whether the UE is enabled to initiate the UE COT when the first parameter indicates the UE to share the BS COT in the second FFP, wherein the means for transmitting the ACK/NACK is further based on the second parameter.

56. The UE of any of clauses 49-54, further comprising:

means for receiving, from the BS, a RRC communication indicating a third parameter, wherein the third parameter indicates whether the UE is enabled to share the BS COT when the first parameter indicates the UE to initiate the UE COT in the second FFP, wherein the means for transmitting the ACK/NACK is further based on the third parameter.

57. A base station (BS), comprising:

means for transmitting, to a user equipment (UE) in a first fixed frame period (FFP), downlink communication information (DCI), wherein the DCI indicates a scheduled DL communication in a second FFP subsequent to the first FFP;

means for performing a channel assessment for a BS channel occupancy time (COT) in the second FFP;

means for determining, based on the channel assessment, not to initiate the BS COT; and means for receiving, in a UE COT, a non-acknowledgement (NACK) signal.

58. The BS of clause 57, wherein:

the DCI indicates at least one of:

the UE to share a BS COT in the second FFP; or the UE to initiate a UE COT in the second FFP.

59. The BS of clause 58, further comprising:

means for transmitting, to the UE, a radio resource control (RRC) communication indicating whether the UE is enabled to initiate the UE COT when the DCI indicates the UE to share the BS COT in the second FFP.

60. The BS of clause 58, further comprising:

means for transmitting, to the UE, a RRC communication indicating whether the UE is enabled to share the BS COT when the DCI indicates the UE to initiate the UE COT in the second FFP.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving, from a base station (BS) in a first fixed frame period (FFP), downlink communication information (DCI), wherein the DCI indicates a scheduled downlink (DL) communication in a second FFP subsequent to the first FFP, and wherein the DCI comprises a first parameter indicating that the UE is allowed to share a BS channel occupancy time (COT) and wherein based on the indicating by the first parameter, the UE is enabled to initiate a corresponding UE COT in the second FFP;

monitoring for a DL signal in the second FFP;

in response to failing to detect the DL signal and being allowed to share the BS COT, initiating the UE COT in the second FFP; and transmitting, based on the monitoring for the DL signal, an acknowledgement/non-acknowledgement (ACK/NACK) in the UE COT indicating whether the scheduled DL communication was detected.

2. The method of claim 1, wherein the transmitting the ACK/NACK comprises:

transmitting, in response to failing to detect the DL signal in the second FFP, the ACK/NACK in a third FFP different from the second FFP, wherein the third FFP is associated with a UE COT.

3. The method of claim 1, wherein:

the first parameter indicates that the scheduled DL communication is associated with the UE COT.

4. The method of claim 1, further comprising:

receiving, from the BS, a radio resource control (RRC) communication indicating a second parameter, wherein the second parameter indicates whether the UE is enabled to initiate the UE COT when the first parameter indicates the UE to share the BS COT in the second FFP, wherein the transmitting the ACK/NACK is further based on the second parameter.

5. The method of claim 1, further comprising:

receiving, from the BS, a radio resource control (RRC) communication indicating a third parameter, wherein the third parameter indicates whether the UE is enabled to share the BS COT when the first parameter indicates the UE to initiate the UE COT in the second FFP, wherein the transmitting the ACK/NACK is further based on the third parameter.

6. The method of claim 1, wherein the first FFP and the second FFP are separated by one or more intermediate FFPs.

7. The method of claim 1, wherein the UE COT is based on the UE performing a listen before talk procedure.

8. The method of claim 1, wherein failing to detect the DL signal further comprises:

determining that the BS has not acquired a COT in the second FFP.

9. A method of wireless communication performed by a base station (BS), the method comprising:

transmitting, to a user equipment (UE) in a first fixed frame period (FFP), downlink communication information (DCI), wherein the DCI indicates a scheduled downlink (DL) communication in a second FFP subsequent to the first FFP, and wherein the DCI comprises a first parameter indicating that the UE is allowed to share a BS channel occupancy time (COT), and wherein based on the indicating by the first parameter, the UE is enabled to initiate a corresponding UE COT in the second FFP;

performing a channel assessment for a BS COT in the second FFP;

determining, based on the channel assessment, not to initiate the BS COT; and receiving, in a UE COT in the second FFP based on the UE being allowed to share the BS COT, a non-acknowledgement (NACK) signal.

10. The method of claim 9, further comprising:

transmitting, to the UE, a radio resource control (RRC) communication indicating whether the UE is enabled to initiate the UE COT when the DCI indicates the UE to share the BS COT in the second FFP.

11. The method of claim 9, further comprising:

transmitting, to the UE, a radio resource control (RRC) communication indicating whether the UE is enabled to share the BS COT when the DCI indicates the UE to initiate the UE COT in the second FFP.

12. The method of claim 9, wherein:

the first parameter indicates that the scheduled DL communication is associated with the UE COT.

13. The method of claim 9, wherein the first FFP and the second FFP are separated by one or more intermediate FFPs.

14. The method of claim 9, wherein the UE COT is based on the UE performing a listen before talk procedure.

15. The method of claim 9, wherein determining not to initiate the BS COT further comprises:

failing a listen before talk procedure.

16. A user equipment (UE), comprising:

a transceiver; and one or more processors in communication with the transceiver, wherein the one or more processors are configured to:

cause the transceiver to receive, from a base station (BS) in a first fixed frame period (FFP), downlink communication information (DCI), wherein the DCI indicates a scheduled downlink (DL) communication in a second FFP subsequent to the first FFP, and wherein the DCI comprises a first parameter indicating that the UE is allowed to share a BS channel occupancy time (COT), and wherein based on the indicating by the first parameter, the UE is enabled to initiate a corresponding UE COT in the second FFP;

monitor for a DL signal in the second FFP;

in response to failing to detect the DL signal and being allowed to share the BS COT, initiate the UE COT in the second FFP; and cause the transceiver to transmit, based on the monitoring for the DL signal, an acknowledgement/non-acknowledgement (ACK/NACK) in the UE COT indicating whether the scheduled DL communication was detected.

17. The UE of claim 16, wherein the one or more processors configured to cause the transceiver to transmit the ACK/NACK comprises the one or more processors configured to cause the transceiver to:

transmit, in response to failing to detect the DL signal in the second FFP, the ACK/NACK in a third FFP different from the second FFP, wherein the third FFP is associated with a UE COT.

18. The UE of claim 16, wherein:

the first parameter indicates that the scheduled DL communication is associated with the UE COT.

19. The UE of claim 16, wherein the one or more processors are further configured to:

cause the transceiver to receive, from the BS, a radio resource control (RRC) communication indicating a second parameter, wherein the second parameter indicates whether the UE is enabled to initiate the UE COT when the first parameter indicates the UE to share the BS COT in the second FFP, wherein the one or more processors are configured to cause the transceiver to transmit the ACK/NACK further based on the second parameter.

20. The UE of claim 16, wherein the one or more processors are further configured to:

cause the transceiver to receive, from the BS, a radio resource control (RRC) communication indicating a third parameter, wherein the third parameter indicates whether the UE is enabled to share the BS COT when the first parameter indicates the UE to initiate the UE COT in the second FFP, wherein the one or more processors are configured to cause the transceiver to transmit the ACK/NACK further based on the third parameter.

21. The UE of claim 16, wherein the first FFP and the second FFP are separated by one or more intermediate FFPs.

22. The UE of claim 16, wherein the UE COT is based on the UE performing a listen before talk procedure.

23. The UE of claim 16, wherein the one or more processors configured to cause the transceiver to fail to detect the DL signal comprises the one or more processors configured to:

determine that the BS has not acquired a COT in the second FFP.

24. A base station (BS), comprising:

a transceiver; and one or more processors in communication with the transceiver, wherein the one or more processors are configured to:

cause the transceiver to transmit, to a user equipment (UE) in a first fixed frame period (FFP), downlink communication information (DCI), wherein the DCI indicates a scheduled downlink (DL) communication in a second FFP subsequent to the first FFP, and wherein the DCI comprises a first parameter indicating that the UE is allowed to share a BS channel occupancy time (COT), and wherein based on the indicating by the first parameter, the UE is enabled to initiate a corresponding UE COT in the second FFP;

perform a channel assessment for a BS channel occupancy time (COT) in the second FFP;

determine, based on the channel assessment, not to initiate the BS COT; and cause the transceiver to receive, in a UE COT in the second FFP based on the UE being allowed to share the BS COT, a non-acknowledgement (NACK) signal.

25. The BS of claim 24, wherein the one or more processors are further configured to:

cause the transceiver to transmit, to the UE, a radio resource control (RRC) communication indicating whether the UE is enabled to initiate the UE COT when the DCI indicates the UE to share the BS COT in the second FFP.

26. The BS of claim 24, further comprising:

cause the transceiver to transmit, to the UE, a radio resource control (RRC) communication indicating whether the UE is enabled to share the BS COT when the DCI indicates the UE to initiate the UE COT in the second FFP.

27. The BS of claim 24, wherein:

the first parameter indicates that the scheduled DL communication is associated with the UE COT.

28. The BS of claim 24, wherein the first FFP and the second FFP are separated by one or more intermediate FFPs.

29. The BS of claim 24, wherein the UE COT is based on the UE performing a listen before talk procedure.

30. The BS of claim 24, wherein the one or more processors configured to determine not to initiate the BS COT comprises the one or more processors configured to:

fail a listen before talk procedure.

* * * * *